(12) United States Patent
Haustein et al.

(10) Patent No.: US 12,231,177 B2
(45) Date of Patent: *Feb. 18, 2025

(54) APPARATUS, MEASUREMENT SYSTEM AND MEASUREMENT SETUP AND METHODS FOR TESTING AN APPARATUS

(71) Applicant: Fraunhofer-Gesellschaft zur Förderung der angewandten Forschung e.V., Munich (DE)

(72) Inventors: Thomas Haustein, Berlin (DE); Paul Leather, Berlin (DE); Ramez Askar, Berlin (DE); Leszek Raschkowski, Berlin (DE); Marcus Großmann, Erlangen (DE); Markus Landmann, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/522,241

(22) Filed: Nov. 29, 2023

(65) Prior Publication Data

US 2024/0097802 A1    Mar. 21, 2024

Related U.S. Application Data

(63) Continuation of application No. 17/953,150, filed on Sep. 26, 2022, now Pat. No. 11,870,503, which is a (Continued)

(30) Foreign Application Priority Data

Nov. 15, 2017  (EP) ..................................... 17201912
Nov. 24, 2017  (EP) ..................................... 17203585

(51) Int. Cl.
    *H04B 17/00*    (2015.01)

(52) U.S. Cl.
    CPC .............................. *H04B 17/0085* (2013.01)

(58) Field of Classification Search
    CPC ................................................. H04B 17/0085
    See application file for complete search history.

(56) References Cited

U.S. PATENT DOCUMENTS

| 9,980,042 | B1 | 5/2018 | Benattar et al. |
| 11,456,806 | B2 | 9/2022 | Haustein et al. |

(Continued)

FOREIGN PATENT DOCUMENTS

| JP | 2005312073 A | 11/2005 |
| JP | 2008-518567 A | 5/2008 |

(Continued)

OTHER PUBLICATIONS

ISO-IEC Standard 7498-1, 2nd edition_1994, pp. 1-58.

(Continued)

*Primary Examiner* — Erika A Washington
(74) *Attorney, Agent, or Firm* — NKL LAW; Jae Youn Kim

(57) ABSTRACT

An apparatus configured for wirelessly communicating in a wireless communications network includes a wireless interface configured for wireless communication and a controller configured for controlling a beam pattern of the wireless interface and at least one communication parameter of the wireless interface. The apparatus is configured for receiving a locking signal indicating a request for locking at least a part of the beam pattern and the at least one communication parameter. The controller is configured for locking at least the part of the beam and the at least one communication parameter responsive to the locking signal.

20 Claims, 20 Drawing Sheets

Related U.S. Application Data continuation of application No. 16/875,345, filed on May 15, 2020, now Pat. No. 11,456,806, which is a continuation of application No. PCT/EP2018/081113, filed on Nov. 13, 2018.

(56) References Cited

U.S. PATENT DOCUMENTS

| | | | |
|---|---|---|---|
| 11,870,503 B2* | 1/2024 | Haustein | H04B 17/20 |
| 2012/0232826 A1 | 9/2012 | Hantsch et al. | |
| 2013/0040682 A1 | 2/2013 | Chang et al. | |
| 2018/0062717 A1 | 3/2018 | Mok et al. | |

FOREIGN PATENT DOCUMENTS

| | | |
|---|---|---|
| JP | 2014527749 A | 10/2014 |
| WO | 2006/047677 A1 | 5/2006 |

OTHER PUBLICATIONS

3GPP TR 38.803, "Study on new radio access technology: Radio Frequency (RF) and co-existence aspects (Release 14)", V14.2.0, Sep. 28, 2017.
3GPP TS 25.141, "Base Station (BS) conformance testing (FDD) (Release 15)", V15.0.0 (Sep. 2017).
3GPP TS 34.114, "User Equipment (UE) / Mobile Station (MS) Over The Air (OTA) antenna performance; Conformance testing (Release 12)", V12.2.0 (Sep. 2016).
3GPP TS 36.521-1, "Evolved Universal Terrestrial Radio Access (E-UTRA); User Equipment (UE) conformance specification; Radio transmission and reception; Part 1: Conformance Testing (Release 14)", V14.4.0 (Sep. 2017).
Ericsson, "Verification of UE transmissions characteristics for mmW", 3GPP draft; R4-1709353, 2017, XP051344493.
Keysight Technologies, "Simplification of baseline method for off-axis measurements of beamlocked Ues", 3GPP draft, R4-1705394, 2017, XP051277498.
Fraunhofer HHI, "Beam Locking Command and Function for Testing", 3GPP draft, R4-1709775, 2017, XP051344899.
Fraunhofer HHI, "Measurement Control Channel and Associated Message Space", 3GPP draft, R4-1706618, 2017, XP051302665.
Ericsson, "Beam Quality requirements for NR", 3GPP draft, R4-1700221, 2017, XP051213537.
3GPP TSG-RAN WG-4, R4-1709382.
3GPP TSG-RAN WG-4, R4-1709865.
3GPP TSG-RAN WG-4, R4-1709866.
3GPP RAN4 #84 R4-1708991.
3GPP R4-1709353, "Verification of UE transmissions characteristics for mmW", Sep. 11, 2017.
3GPP R4-1706618, "Measurement Control Channel and Associated Message Space", Jun. 19, 2017.
3GPP R4-1700221, "Beam Quality requirements for NR", Jan. 6, 2017.
Chun Dae Nyeong, "Office Action for KR Application No. 10-2020-7016912", Jun. 28, 2021, KIPO, Korea.
Maeda Noriyuki, "Office Action for JP Application No. 2020-526899", Jun. 30, 2021, JPO, Japan.
Keysight Technologies, "Design and Verification Challenges: Beamforming" (Jul. 31, 2014), pp. 429-456, Reprinted from LTE and the Evolution to 4G Wireless Design and Measurement Challenges, Second Edition, Keysight Technologies, USA.
Ushirozawa Mizuyuki, Notification of Reasons for Refusal for Japanese Patent Application No. 2022-153000, Nov. 28, 2023.

* cited by examiner

APPARATUS, MEASUREMENT SYSTEM AND MEASUREMENT SETUP AND METHODS FOR TESTING AN APPARATUS

CROSS-REFERENCES TO RELATED APPLICATIONS

This application is a continuation of U.S. application Ser. No. 17/953,150, filed Sep. 26, 2022, which is a continuation of U.S. application Ser. No. 16/875,345, filed May 15, 2020, which in turn is a continuation of PCT International Application No. PCT/EP2018/081113, filed Nov. 13, 2018, which is incorporated herein by reference in its entirety, and additionally claims priority from European Applications Nos. EP 17 201 912.7, filed Nov. 15, 2017 and EP 17 203 585.9, filed Nov. 24, 2017, all of which are incorporated herein by reference in their entirety.

TECHNICAL FIELD

The present invention relates to an apparatus to be tested, e.g., in view of its wireless operation, to a measurement systems and to methods for testing an apparatus. The present invention further relates to a measurement setup. The present invention further relates to beam pattern property locking, beam pattern locking, beam-locking, power-locking and MCS-locking, i.e., functions of a test interface that serves Over-The-Air (OTA) testing.

BACKGROUND OF THE INVENTION

The ISO Open Systems Interconnection standard [1] with its layered model concept has been adopted in a variety of computer and telecommunication systems including those that are loosely known as 4G, beyond 4G, 5G and beyond 5G systems. Using this model, the circuitry that may be used to implement the functions of transmission and reception of raw data over a physical medium—the radio transceivers and their associated antenna systems—reside in the so-called physical layer (PHY). Parameters used in the PHY layer thus control the way in which the radio transceiver(s) and their antenna system(s) operate. During normal operation, these parameters are controlled automatically to ensure that the communication system performs according to criteria determined by so-called higher layers.

Beam locking is extensively discussed by 3GPP RAN WG4 and is a topic upon which it has recently reached agreement for its need (although the details are yet to be discussed in 3GPP RAN WG5). Beam locking refers to locking, freezing or remaining unchanged a beam pattern formed by the apparatus to be tested, i.e., the Device under Test, wherein such a beam pattern may be used for a transmission from the apparatus, i.e., a transmitting beam and/or for reception with the apparatus, i.e., for a receiving beam.

Thus, there is a need to enhance measurements of the apparatus.

SUMMARY

According to an embodiment, an apparatus configured for wirelessly communicating in a wireless communications network may have: a wireless interface configured for wireless communication; and a controller configured for controlling a beam pattern of the wireless interface and at least one communication parameter of the wireless interface; wherein the apparatus is configured for receiving a locking signal indicating a request for locking at least a part of the beam pattern and the at least one communication parameter; and wherein the controller is configured for locking the part of the beam pattern and the at least one communication parameter responsive to the locking signal.

According to another embodiment, an apparatus configured for wirelessly communicating in a wireless communications network may have: a wireless interface configured for wireless communication; and a controller configured for controlling a beam pattern of the wireless interface and at least one communication parameter of the wireless interface; wherein the apparatus is configured for receiving a locking signal indicating a request for locking at least one property of the beam pattern and the at least one communication parameter; and wherein the controller is configured for locking the part of the beam pattern and the at least one communication parameter responsive to the locking signal.

According to another embodiment, a measurement system may have: a measurement interface configured for communicating with an apparatus configured for performing wireless communication in a wireless communications network, so as to control the apparatus during a test procedure of the measurement system; a signal generator configured for generating a locking signal indicating a request for locking a beam pattern and at least one communication parameter of the wireless communication in the wireless communications network; and a transmission interface configured for transmitting the locking signal to the apparatus.

According to another embodiment, a measurement setup may have: an inventive apparatus; and an inventive measurement system; wherein the measurement system is configured for transmitting the locking signal to the apparatus and for determining the characteristic of the apparatus.

According to another embodiment, a measurement setup may have: a measurement system and an apparatus to be tested with the measurement system; wherein the measurement system is configured for operating an apparatus so as to acquire a beam pattern generated by the apparatus; wherein the measurement system is configured for instructing the apparatus so as to lock at least a part of the beam pattern and a communication parameter; wherein the measurement system is configured for moving the apparatus such that a null of the beam pattern is directed towards a measurement interface configured for measuring the beam pattern; wherein the measurement system is configured for instructing the apparatus so as to form at least a lobe of the beam pattern so as to superimpose the null; and wherein the measurement system is configured for measuring the beam pattern with the measurement interface.

According to another embodiment, a method for testing an apparatus may have the steps of: transmitting, to the apparatus, a locking signal indicating a request for locking at least a part of a beam pattern formed by the apparatus and at least one communication parameter of the apparatus; and locking the part of the beam pattern and the at least one communication parameter responsive to the locking signal.

According to another embodiment, a method for testing an apparatus may have the steps of: operating an apparatus so as to acquire free running lobes and nulls of a beam pattern generated by the apparatus in a normal operation; establishing a connection to the apparatus; instructing the apparatus so as to lock a communication parameter; instructing the apparatus so as to lock at least a part of the beam pattern of the apparatus; determining metrics of the apparatus; change a measurement condition of the apparatus; repeat determining metrics of the apparatus and/or changing a measurement condition of the apparatus; and instructing the apparatus so as to unlock the part of the beam pattern and the communication parameter.

According to another embodiment, a method for testing an apparatus may have the steps of: operating an apparatus so as to acquire a beam pattern generated by the apparatus; instructing the apparatus so as to lock at least a part of the beam pattern and a communication parameter; moving the apparatus such that a null of the beam pattern is directed towards a measurement interface configured for measuring the beam pattern; instructing the apparatus so as to form at least a lobe of the beam pattern so as to superimpose the null; and measuring the beam pattern with the measurement interface.

An embodiment may have a non-transitory digital storage medium having a computer program stored thereon to perform the inventive method for testing an apparatus or having the steps of: operating an apparatus so as to acquire free running lobes and nulls of a beam pattern generated by the apparatus in a normal operation; establishing a connection to the apparatus; instructing the apparatus so as to lock a communication parameter; instructing the apparatus so as to lock at least a part of the beam pattern of the apparatus; determining metrics of the apparatus; change a measurement condition of the apparatus; repeat determining metrics of the apparatus and/or changing a measurement condition of the apparatus; and instructing the apparatus so as to unlock the part of the beam pattern and the communication parameter, when said computer program is run by a computer.

Another embodiment may have a non-transitory digital storage medium having a computer program stored thereon to perform the method for testing an apparatus having the steps of: operating an apparatus so as to acquire a beam pattern generated by the apparatus; instructing the apparatus so as to lock at least a part of the beam pattern and a communication parameter; moving the apparatus such that a null of the beam pattern is directed towards a measurement interface configured for measuring the beam pattern; instructing the apparatus so as to form at least a lobe of the beam pattern so as to superimpose the null; and measuring the beam pattern with the measurement interface, when said computer program is run by a computer.

The inventors have found that for test and measurement purposes that use beam locking, changes within the beam are caused due to automatic control of communication parameters such as transmission power, which therefore leads to imprecise measurement results of the radiation behaviour of an apparatus. The inventors have further found that by locking such a communication parameter together with the beam precise measurements may be obtained. Thus, by locking the communication parameter it may be ensured that a specific operation is restricted or locked in order to ensure reliability of boundary conditions such as a beam polarization, beam width, beam directionality, transmitter power, resource block allocation, i.e., a resource mapping used for transmission or reception with the part of the beam, a test or reference signal selection, a modulation and coding scheme (MCS) and/or a selected power and/or applied power. The inventors have further found that it is of advantage to lock a property of the beam pattern and that such properties without loss of generality include time properties, frequency properties, spatial properties and coding properties for example space-time-codes, space-frequency codes and space-time-frequency codes. The inventors have further found that such embodiments may be implemented, without limitation, for null locking.

According to an embodiment an apparatus configured for wirelessly communicating in a wireless communications network comprises a wireless interface configured for wireless communication; and a controller configured for controlling a beam pattern formed with the wireless interface and at least one communication parameter of the wireless interface. The apparatus is configured for receiving a locking signal indicating a request for locking at least a part of the beam pattern and the at least one communication parameter. The controller is configured for locking at least the part of the beam and the at least one communication parameter responsive to the locking signal. This allows for enhanced precise measurements as the part of the beam remains unchanged even when changing a position or condition of the apparatus.

According to an embodiment a measurement system comprises a measurement interface configured for communicating with an apparatus configured for performing wireless communication in a wireless communications network, so as to control the apparatus during a test procedure of the measurement system; a signal generator configured for generating a locking signal indicating a request for locking a beam and at least one communication parameter of the wireless communication in the wireless communications network; and a transmission interface configured for transmitting the locking signal to the apparatus. This allows for enhanced precise measurements by controlling the apparatus with the locking signal.

According to an embodiment, a measurement setup comprises an apparatus according to an embodiment and a measurement system according to an embodiment. The measurement system is configured for transmitting the locking signal to the apparatus and for determining the characteristic of the apparatus.

According to an embodiment a method for testing an apparatus comprises:
transmitting, to the apparatus, a locking signal indicating a request for locking at least a part of a beam pattern formed by the apparatus and at least one communication parameter of the apparatus;
and locking the part of the beam pattern and the at least one communication parameter responsive to the locking signal.

According to an embodiment, a method for testing an apparatus comprises:
operating an apparatus so as to obtain free running lobes and nulls of a beam pattern generated by the apparatus in a normal operation;
establishing a connection to the apparatus;
instructing the apparatus so as to lock a communication parameter;
instructing the apparatus so as to lock at least a part of the beam of the apparatus;
determining metrics of the apparatus;
change a measurement condition of the apparatus;
repeat determining metrics of the apparatus and/or changing a measurement condition of the apparatus; and
instructing the apparatus so as to unlock the part of the beam and the communication parameter.

According to an embodiment, a non-transitory storage medium has stored thereon computer readable instructions being configured for performing a method according to one of the embodiments when running on a computer.

According to an embodiment, an apparatus configured for wirelessly communicating in a wireless communications network may have: a wireless interface configured for wireless communication; and a controller configured for controlling a beam pattern of the wireless interface and at least one communication parameter of the wireless interface;

wherein the apparatus is configured for receiving a locking signal indicating a request for locking the at least one communication parameter; and wherein the controller is configured for locking the at least one communication parameter responsive to the locking signal.

According to another embodiment, a method for testing an apparatus may have the steps of: receiving, with the apparatus, a locking signal indicating a request for locking at least one communication parameter at least a part of a beam pattern formed by the apparatus; and locking the at least one communication parameter responsive to the locking signal.

The inventors have found that for test and measurement purposes that use beam locking, changes within the beam are caused due to automatic control of communication parameters such as transmission power, which therefore leads to imprecise measurement results of the radiation behaviour of an apparatus. The inventors have further found that by locking such a communication parameter together with the beam precise measurements may be obtained. Thus, by locking the communication parameter it may be ensured that a specific operation is restricted or locked in order to ensure reliability of boundary conditions such as a beam polarization, beam width, beam directionality, transmitter power, resource block allocation, i.e., a resource mapping used for transmission or reception with the part of the beam, a test or reference signal selection, a modulation and coding scheme (MCS) and/or a selected power and/or applied power. The inventors have further found that it is of advantage to lock a property of the beam pattern and that such properties without loss of generality include time properties, frequency properties, spatial properties and coding properties for example space-time-codes, space-frequency codes and space-time-frequency codes. The inventors have further found that such embodiments may be implemented, without limitation, for null locking.

According to an embodiment an apparatus configured for wirelessly communicating in a wireless communications network comprises a wireless interface configured for wireless communication; and a controller configured for controlling a beam pattern formed with the wireless interface and at least one communication parameter of the wireless interface. The apparatus is configured for receiving a locking signal indicating a request for locking at least a part of the beam pattern and the at least one communication parameter. The controller is configured for locking at least the part of the beam and the at least one communication parameter responsive to the locking signal. This allows for enhanced precise measurements as the part of the beam remains unchanged even when changing a position or condition of the apparatus.

According to an embodiment a measurement system comprises a measurement interface configured for communicating with an apparatus configured for performing wireless communication in a wireless communications network, so as to control the apparatus during a test procedure of the measurement system; a signal generator configured for generating a locking signal indicating a request for locking a beam and at least one communication parameter of the wireless communication in the wireless communications network; and a transmission interface configured for transmitting the locking signal to the apparatus. This allows for enhanced precise measurements by controlling the apparatus with the locking signal.

According to an embodiment, a measurement setup comprises an apparatus according to an embodiment and a measurement system according to an embodiment. The measurement system is configured for transmitting the locking signal to the apparatus and for determining the characteristic of the apparatus.

According to an embodiment a method for testing an apparatus comprises:
  transmitting, to the apparatus, a locking signal indicating a request for locking at least a part of a beam pattern formed by the apparatus and at least one communication parameter of the apparatus;
  and locking the part of the beam pattern and the at least one communication parameter responsive to the locking signal.

According to an embodiment, a method for testing an apparatus comprises:
  operating an apparatus so as to obtain free running lobes and nulls of a beam pattern generated by the apparatus in a normal operation;
  establishing a connection to the apparatus;
  instructing the apparatus so as to lock a communication parameter;
  instructing the apparatus so as to lock at least a part of the beam of the apparatus;
  determining metrics of the apparatus;
  change a measurement condition of the apparatus;
  repeat determining metrics of the apparatus and/or changing a measurement condition of the apparatus; and
  instructing the apparatus so as to unlock the part of the beam and the communication parameter.

According to an embodiment, a non-transitory storage medium has stored thereon computer readable instructions being configured for performing a method according to one of the embodiments when running on a computer.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
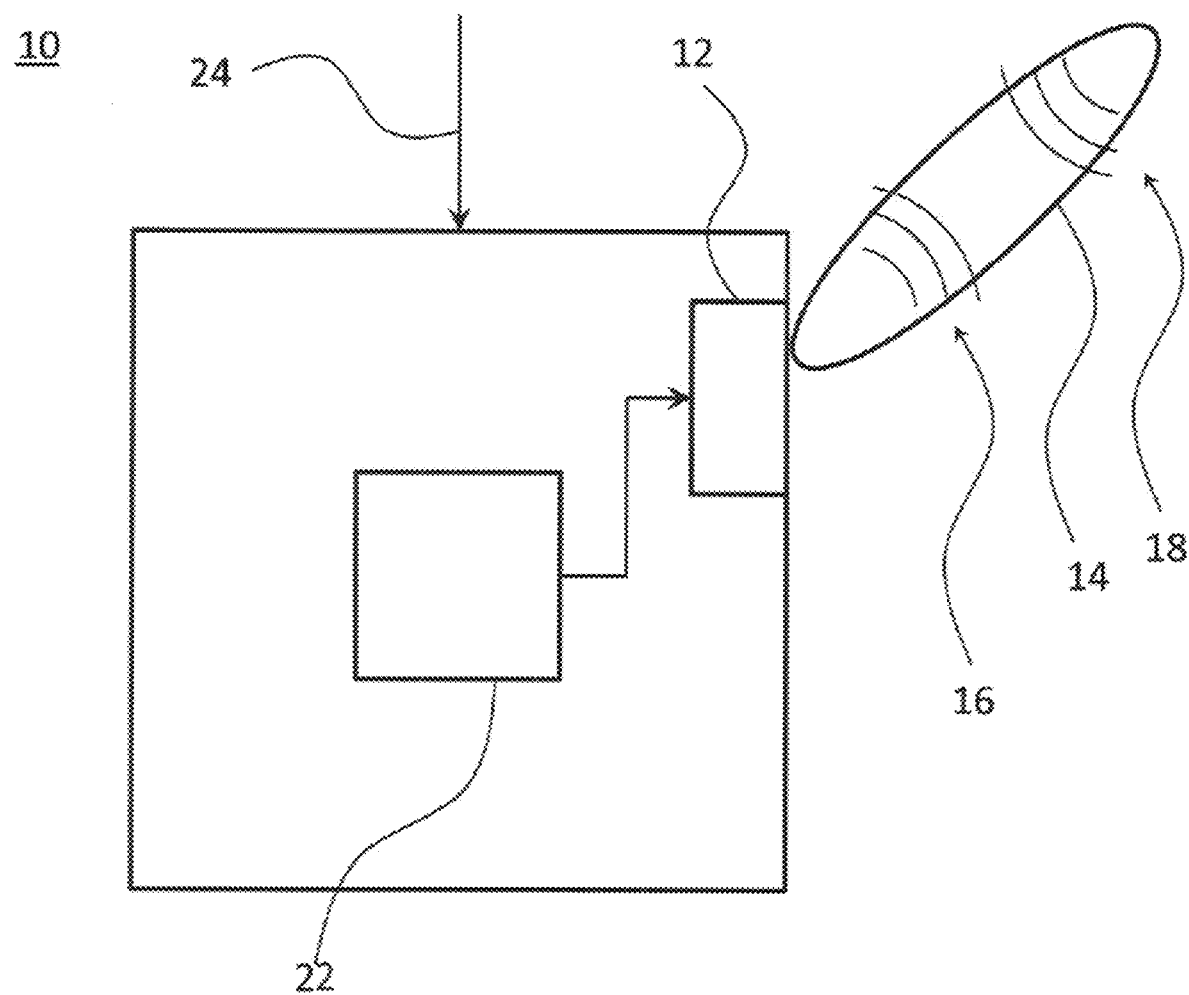
FIG. 1 shows a schematic block diagram of an apparatus according to an embodiment.

Equal or equivalent elements or elements with equal or equivalent functionality are denoted in the following description by equal or equivalent reference numerals even if occurring in different figures.

Embodiments described herein may relate to one or more beam patterns formed by an apparatus. A beam pattern may comprise one or more beams which are to be understood as directing an antenna capability, i.e., transmitting/sending capability and/or receiving capability towards a specific direction, wherein this does not exclude forming the beam as an omnidirectional lobe. A beam may comprise one or more main lobes. Beside the beam, the beam pattern may comprise one or more side lobes. Between beams and/or lobes and/or lobes, a null may be arranged. A lobe may be understood as a spatial region along which or from which signals are transmitted/received with a higher quality when compared to other regions. The beam pattern may comprise a null, e.g., between a first and a second lobe or at a different position. A null which may be understood as a spatial region along which or from which a low amount of transmission power is transmitted or from which signals are received with a lower quality when compared to the region of a lobe. E.g., the transmission power at a null may be lower when compared to the centre of a lobe by at least 20 dB, at least 40 dB or at least 60 dB or even more. Rephrased, forming a "null" may be understood that the formed beam pattern is spatially structured such that into a specific direction or spatial sector very little or in a perfect world no power is transmitted or received from. Such a "null" may be of importance in order not to cause interference into a specific direction, e.g., where another communication device A communicates with another communication device B on the same time frequency resources. In other words, the beam may comprise one or more lobes and may comprise nulls between lobes. A beam may be formed for transmission purposes, i.e., as a transmission beam which may be understood as directing transmission power for transmitting a wireless signal towards a specific direction relative to the apparatus. Alternatively or in addition, a beam may be formed for reception purposes, i.e., as a receiving beam, i.e., antenna gains are adjusted or controlled so as to generate an advantageous direction of reception of a wireless signal. The beam may be used for transmitting and/or receiving a signal at radiofrequency with a regular or irregular spatial pattern which may be used for beamforming Embodiments described herein may relate to extended beam patterns. An extended beam pattern may be understood as a single beam pattern or a superposition of at least a first beam pattern and a second beam pattern, wherein such a superposition may be obtained for two or more transmitting beams or beam patterns, two or more receiving beams or beam patterns and/or at least one transmission beam or beam pattern and at least one receiving beam or beam pattern. I.e., when performing pattern locking according to embodiments, this may relate to beam locking and/or null locking. Beam locking may relate to lock one or more beams and/or lobes of a beam pattern, wherein null locking may relate to lock at least one null. Pattern locking may thus may also relate to lock elements of different beams or even one or more complete beams and/or to a combination of beam locking and null locking. In other words, a transmission comprises sending/transmitting a signal and receiving a signal. A communication parameter may relate to a parameter at least influencing a receiver property and/or a transmitter property. Embodiments therefore relate to transmission and/or reception and, without limitation to uplink and downlink.

Embodiments described herein refer to locking beam properties and/or at least a part of beam patterns and/or communication parameters. Locking in connection herewith may be understood as controlling the respective element or parameter so as to comprise an invariant status or at least a status comprising a low amount of change, e.g., less than 10%, less than 5% or less than 1%. Such a lock may be executed, for example, during normal operation during which said beam pattern or at least a part thereof and/or parameter are adapted, changed or controlled so as to comply with the requirements of the present operation. Based on the locking said beam, part thereof or parameter may be locked, i.e., preserved, frozen or maintained constant, probably within the above indicated tolerance range, such that the beam pattern and/or communication parameter remains as it is, even when changes of the apparatus, e.g., with respect to orientation or position, would cause a change thereof during normal operation. When referring to unlocking, the beam pattern, part thereof and/or communication parameter may be released such that adaptation according to the present operating mode may be performed.

I.e., embodiments relate to locking certain radiation pattern characteristics for the measurement of antennas that are used for transmitting signals, transmit or transmission antennas, and the measurement of antennas that are used for receiving signals, receive or reception antennas. Embodiments referring to the communication parameter thus cover both transmission and reception. Embodiments cover beam pattern properties which without loss of generality include time properties, frequency properties, spatial properties and coding properties for example space-time-codes, space-frequency codes and space-time-frequency codes. Embodiments further cover, amongst other things, power locking and Modulation Coding Scheme level locking, resource block allocation locking and test or reference signal selection locking, again for both transmission and reception. Alternatively or in addition, locking the communication parameter may relate to a locking of used resources, e.g., in time and/frequency and/or one or several antenna or Multiple Input Multiple Output (MIMO) layers/beams. This may be referred to as locking of radio resource mapping. I.e., locking the beam pattern and/or the communication parameter may relate to lock the used resource map for transmission and/or reception. Locking the resource map may comprise locking related functionalities such as frequency hopping or at least performing such functionality according to a predefined pattern so as to enable the measurement system to perform appropriate tests. In 4G-LTE and 5G-NR modulated and coded symbols are mapped onto OFDM symbols (time) and OFDM subcarriers (frequency) resources. Such resources may be selected by a so called resource scheduler and communicated within a communication block, a so-called physical resource (PR) or outside using other control channel options. Such resource allocation can be static, quasi-static or dynamic over time and mapping can involve the degrees of time, frequency and spatial domain (MIMO layers).

Furthermore, a predefined, i.e., pre-agreed/known, pattern like a so called hopping pattern as used in WiMax or Bluetooth can be used. Therefore, depending on the mapping of time/frequency resources on different MIMO layers on the beams, the resulting beam pattern and/or their superposition can vary in time in normal operation and may therefore be locked, released, probably locked again, etc. Alternatively or in addition, the radio resource mapping may be set into a predefined and looping mode, allowing the measurement system to sync and exploit such knowledge. This may be of importance if the Over-the-Air (OTA) measurement is done based on reference symbols (RS) which a mapped on specific time, frequency resources of the different spatial layers.

Further, pattern locking is not just covering the shape of the beam but may be extended to polarization effects, e.g., a specific beam pattern may appear in horizontal or vertical polarization, circular left or circular right or in different polarization modes. The communication parameter may refer to lock such a polarization, again for transmission and/or reception. Pattern locking and/or locking the communication parameter may thus relate to locking a resource mapping used for transmission or reception with the part of the beam and/or locking a polarization used for transmission or reception with the part of the beam.

Embodiments described herein relate to one or more communication parameters. The communication parameter may influence the properties of a beam pattern, wherein the beam pattern may be used for transmission purpose and/or for receiving purpose. Thus, the communication parameter shall not limit the embodiments to parameters used for transmitting direction but relates in contrast to sending a wireless signal which includes both, transmitting and receiving.

According to embodiments, in extension of pattern locking in terms of fixing an orientation of a single beam/lobe and/or null relative to the apparatus, at least one further parameter in connection with reception and/or transmission of wireless signals, i.e., at least one communication parameter, is locked together with the beam pattern. In general, it can be said that some aspect or characteristic of the antenna's radiation pattern are fixed or locked. This may be one or more main lobes of the beam pattern and/or one of its nulls.

According to embodiments, for example, locking may be applied to:
1. Beam
   a. A single lobe of the beam pattern
   b. Multiple lobes of the beam pattern
2. Beamformed Pattern, i.e., a combination of lobes and/or nulls
   a. TRP (total radiated power) measurement
   b. RTP (Received total power) measurement
3. Lobe(s)
   a. The main lobe, the first side lobe (e.g., left/right/above/below beam centre)
   b. The second/third/$N^{th}$ lobe, (e.g., left/right/above/below beam centre)
   c. A side lobe of a given level with respect to the main lobe (that is, for a given side lobe level (SLL) of X dB) (e.g., left/right/above/below beam centre)
4. null(s)
   a. A single null
   b. Multiple nulls
   c. A null of a given level with respect to the main beam (that is, for a given null level (NL) of X dB) (left/right/above/below beam centre)
5. Panel(s) or sub-array(s)
   a. Beams or beam patterns emitted by a single panel of antenna elements, i.e., antenna sub-array
   b. Beams or beam patterns emitted by multiple panels/sub-arrays
   c. Beams of adjacent/parallel/orthogonal/diagonal/diametrical-opposed panels/sub-arrays
   d. A side lobe of a given level with respect to the main beam (that is, for a given side lobe level (SLL) of X dB) (left/right/above/below beam centre)
6. Array(s)
   a. A single antenna array
   b. Multiple antenna arrays
   c. Arrays of arrays When comparing locking of multiple lobes of a beam pattern according to point 1b and lobes according to point 3, a difference may be seen in that the beam can be said to be the "strongest" part of the pattern. Typically, any pattern that is shaped to form a beam will also have lobes that are not as strong as the (main) beam which may have one or more lobes. The number of lobes associated with a single (main) beam may depend on the type and/or design of the antenna. Some antennas may be designed to have a pattern that exhibits more than one beam, an example of which includes an antenna array that uses multiple beams to serve multiple users. A null can be found in between the main beam and the lobe and in between adjacent lobes. Without affecting the main beam, nulls can be directed towards sources of interference so as to reduce their effects against the wanted signal.

As a general description the embodiments described herein may be understood as explaining a concept which may be referred to as beam pattern property locking and/or null pattern property locking, i.e., the beam and/or null may be locked together with further properties which may be defined, by the communication parameter.

FIG. 1 shows a schematic block diagram of an apparatus 10 according to an embodiment. The apparatus 10 is configured for wirelessly communicating in a wireless communications network such as a mobile communications network, e.g., operating according to a Long Term Evolution (LTE) standard and/or a 5G standard also referred to as new radio. The apparatus 10 comprises a wireless interface 12 configured for wireless communication. The wireless interface 12 may comprise an antenna or a plurality of antennas, e.g., an antenna array, and may be configured for beamforming, i.e., to adapt a direction along which a beam or a null of a beam pattern 14 is directed. Controlling of the direction of the beam or null may thus allow for controlling at least one direction along which a transmission signal 16 may be transmitted and/or from which a reception signal 18 may be received. For receiving and for transmitting, individual beams and/or beam patterns may be formed, e.g., each having one more main lobes pointing towards different directions. Thus, although apparatus 10 is illustrated as generating the beam pattern 14 only, also additional beams and/or beam pattern may be generated.

The apparatus 10 comprises a controller 22 configured for controlling a pattern of the beam pattern 14 of the wireless interface 12 and at least one communication parameter of the wireless interface 12. I.e., the controller 22 may control the wireless interface 12 so as to form the beam pattern 14 and/or more than one beam or beam pattern spatially superimposing each other to an extended beam pattern. The at least one communication parameter may be understood as a single parameter and/or as a plurality of parameters. Controlling the beam or beam pattern 14 or extended beam pattern may comprise controlling a least a beam or null of the beam pattern 14 so as to comprise a time variant shape and/orientation relative to the apparatus 10 and/or to comprise a constant or almost constant shape and/orientation responsive to a varying environment influencing the shape and/orientation. The communication parameter may comprise, by non-limiting example only, a transmission power used for generating or forming the beam pattern 14, a beam polarization, a beam width, a beam directionality, a resource block allocation, i.e., a resource mapping used for transmission or reception with the part of the beam, a test or reference signal selection, and a modulation coding scheme (MCS) used for the wireless communication. The apparatus 10 is configured for receiving a locking signal 24. The locking signal 24 may indicate a request for locking the beam pattern 14 and the at least one communication parameter. Thus, the locking signal 24 may indicate a request for locking at least one property of the beam pattern 14 and probably including thereby the at least one communication parameter. Those definitions may be combined with each other without limitation such that embodiments relating to the locking signal indicating a request to lock at least the part of the beam and the communication parameter may also relate to the locking signal indicating a request for locking the beam property. The locking signal 24 may be received with a wired or wireless dedicated interface, e.g., forming a part of a measurement control channel between a measurement system and the apparatus 10, but may also be received with the wireless interface 12.

When referring to the control signal 24 being adapted so as to comprise a request for locking the at least the part of the beam pattern 14, this may relate, amongst other things, to at least one transmission beam, i.e., a direction along which a high transmission power is emitted, a null within a transmission beam pattern, i.e., a direction along which none or low transmission power is emitted and/or a reception beam, i.e., a direction from which signals may be received.

Beam forming may comprise a use of a so-called analogue stage and may in addition may comprise a use of a so-called digital stage. Within the analogue stage, antenna elements of a set of antenna elements may be controlled individually so as to form a virtual antenna having an antenna property to be controlled such as a directivity. For this purpose, elements like phase shifters, time delay elements, attenuators or the like which may operate in the radio frequency range or in the intermediate frequency range may be controlled. Such elements may form a network which may be referred to as beam pattern control network as the beam pattern is created as a result of the network implemented in analogue domain and applied on the radio frequency (RF) or intermediate frequency (IF) signal. Alternatively or in addition, the network may be implemented in the digital domain. In the digital domain it can be done in base band with sample clock wise multiplication of I/Q values with complex numbers or in digital IF (e.g. digital upconverted signals) again as a sample clock wise multiplications of complex or real valued time domain signals with complex or real valued matrix, wherein the multiplications may represent the beam forming network elements. Locking the analogue part of a part of the beam pattern may thus relate to control the antenna elements so as to lock the virtual antenna emission or reception pattern.

Within the digital stage, at least one but also a plurality or multitude of virtual antennas may be controlled, e.g., by using elements such as multiplicators or matrix-vector multiplications for adapting or manipulating signals in e.g. the I/Q or IF domain, i.e., the digital domain Such operations may be performed in the baseband. Locking the digital part of a part of the beam pattern may thus relate to control at least one virtual antenna as a whole.

The locking signal 24 may comprise instructions indicating that the apparatus in instructed to lock at least a part of the beam pattern 14. This may comprise instructions indicating that only the analogue part of the beam pattern 14 or a part thereof is requested to be locked. Alternatively, this may comprise instructions indicating that only the digital part of the beam pattern 14 or a part thereof is requested to be locked. Alternatively, this may comprise instructions indicating that the analogue part and the digital part of the beam pattern 14 or a part thereof is requested to be locked. Alternatively or in addition, such discrimination between analogue and digital domain may be combined with instructions in the locking signal 24 indicating to lock a transmission beam and/or a reception beam, i.e., a discrimination between transmission beams and receiving beams.

The controller 22 is configured for locking at least a part of the beam pattern 14. A part of the beam pattern may relate to a beam, a lobe thereof, a null and/or a spatial part or portion thereof but may also refer to an incomplete portion of the beam in another dimension such as frequency. For example, the beam may be formed in more than one frequency band or using more than one subcarrier, e.g., using carrier aggregation. Transmission band may refer to a band in which a communication happens (receiver or transmitter side) between UE and eNB. Different subcarriers may be used or applied with different beamformers. Locking at least the part of the beam pattern 14 may then relate to lock the beam and/or a lobe thereof and/or a null in at least one frequency band and/or subcarrier. Thus, the controller 22 may be configured for forming the beam pattern 14 in at least a first portion of a transmission frequency spectrum and in a second portion of the transmission frequency spectrum, wherein the controller 22 may be configured for locking the part of the beam pattern 14 in the first portion of the transmission frequency spectrum whilst remaining the part of the beam unlocked in the second portion of the transmission frequency spectrum responsive to the locking signal. Alternatively or in addition, when referring to the spatial pattern of the beam, locking a part of the beam may comprise forming the beam pattern 14 with the wireless interface 12, the beam pattern 14 comprising at least one or a higher number of lobes and a null. The controller may be configured for locking the lobe or more than one lobes and/or the null whilst remaining the unlocked elements, i.e., at least one of the lobes, or the null. This does not exclude to lock the complete beam.

By locking the property of the beam or the part of the beam pattern 14, e.g., at least a beam or lobe thereof, and/or null and/or frequency band and/or subcarrier thereof, and the at least one communication parameter responsive to the locking signal 24, the locked part may be controlled so as to remain unchanged or changed within a specific tolerance range. For example, the beam pattern 14 may comprise at least one beam, wherein the controller is configured for controlling a direction along which the at least one beam is emitted relative from the wireless interface 12. For locking at least the property or part of the beam, the controller is configured for maintaining the direction. Alternatively or in addition, the beam pattern 14 may comprise a null directed in a specific direction. The null may be arranged between a first lobe and a second lobe but may also be arranged elsewhere and refers to a direction along which a low amount of power is transmitted and/or from where a low sensitivity for receiving signals is obtained. The controller 22 may be configured for controlling a direction along which the null is emitted from the wireless interface 22, wherein, for locking at least the part the beam pattern 14, the controller 22 is configured for maintaining the direction. This allows for examining the apparatus 10 and its behaviour whilst preserving the present state of operation, e.g., using a measurement system. For example, a measurement system may comprise a certain amount of resolution being at least partially determined by a number of antennas in the measurement system. Those antennas may be arranged spatially distributed such. The measurement system may be configured for moving, e.g., shifting and/or rotating, the apparatus 10 so as to measure different orientations and/or positions of the apparatus 10. The measurement system may, at the same time, emulate or represent a communication partner of the apparatus 10, e.g., a base station when the apparatus 10 is a User Equipment, or a User Equipment when the apparatus 10 is a base station. Based on a varying relative orientation of the apparatus 10 with respect to the emulated communication partner, operation of the apparatus 10, e.g., controlled by the controller 22, may cause the beam of the beam pattern 14 to be moved with respect to the apparatus 10, e.g., according to a tracking of the communication partner. Even when locking the shape of the beam of the beam pattern 14, the controller 22 may cause communication parameters to vary, e.g., antenna gains, transmission powers and/or modulation schemes, such that by only locking the beam insufficient measurement results would be obtained. By also locking at least one communication parameter the apparatus 10 may be controlled in a state in which it may be shifted and/or rotated within without changing its behaviour such that it may be examined with a high precision.

Figure 3A:
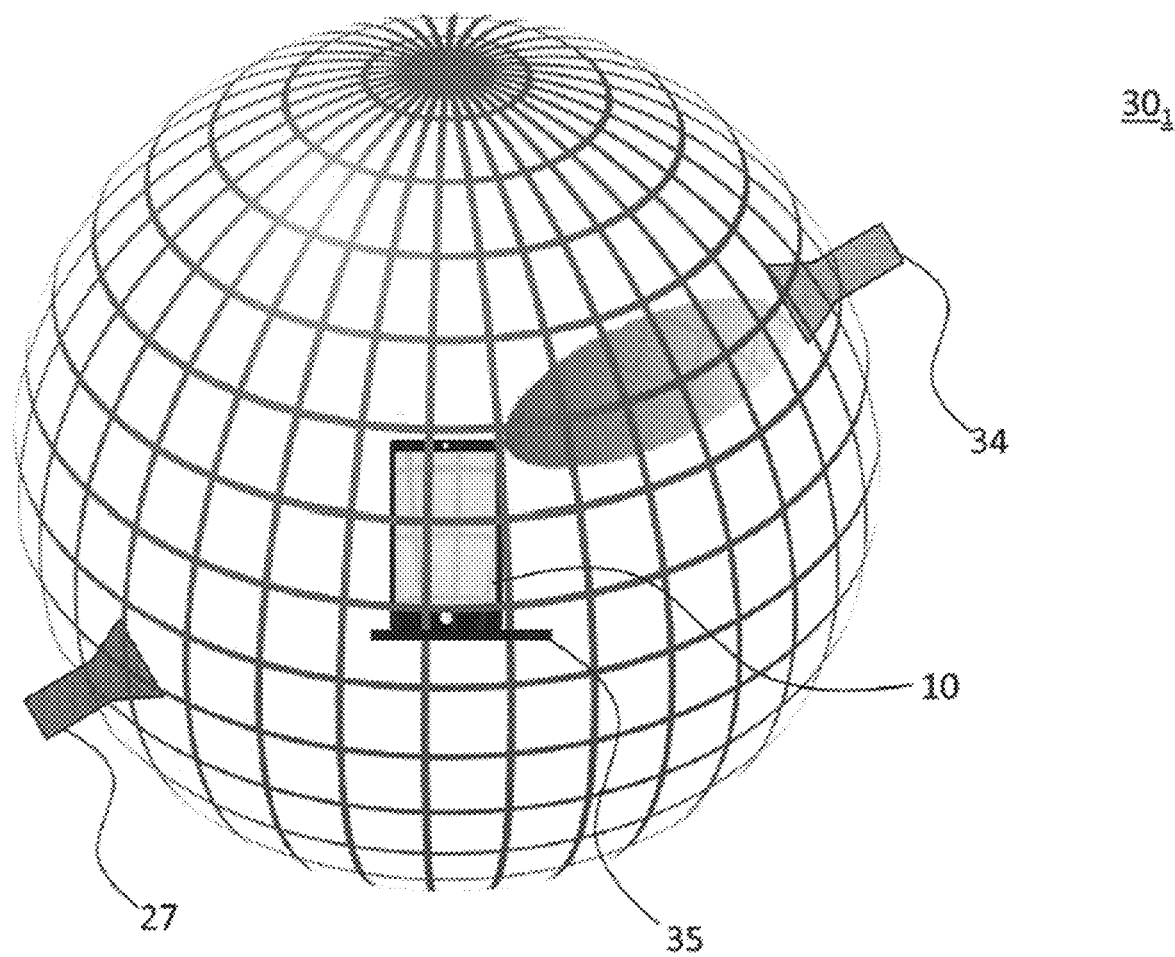
FIG. 3a shows a schematic block diagram of a measurement setup according to further embodiment.

According to an embodiment, the apparatus 10 is configured for locking a transmission power and/or receiving power (gain) as communication parameter. The advantage of power locking is explained as follows. During a specific measurement in which the beam has been locked, the device under test is rotated in order to perform off-centre measurements. As shown in FIG. 3a, one antenna combination is, for example, used to maintain a link between the DUT and the test equipment while a second antenna combination is used for measurement purposes. Locking the transmit or receive power allows for preventing the DUT's transmit power management controller compensating for changes in direction. This test case is representative of e.g., multi-cell, dual connectivity, inter-RAT (Radio Access Technology) or non-standalone operation. Alternatively or in addition, pattern locking and/or locking the communication parameter may thus relate to locking a resource mapping used for transmission or reception with the part of the beam and/or locking a polarization used for transmission or reception with the part of the beam.

Although referring to a null as a part of the beam and therefore to locking a null when referring to pattern locking, pattern locking may relate to beam locking and/or to null locking. It is noted that descriptions made in connection with locking at least a part of a beam may also apply for null locking and vice versa. Therefore, beam pattern property locking may relate to pattern locking in combination with locking the at least one or more communication parameters wherein pattern locking itself refers to beam locking and/or null locking. In embodiments of multi-users which, for example, consider the effects of interference, for example the relatively high-power transmission of a signal that can be described as "unwanted" by a particular user, the need to point a null of the user's antenna's radiation pattern in the direction of the interferer is foreseen. I.e., alternatively or in addition to directing a beam or lobe towards a specific location, e.g., transmitter or receiver, a null may be pointed to one or more specific directions, e.g., other apparatus. In connection with the present embodiments, null locking therefore may be understood as a part of pattern locking similar to beam locking except for a null being locked. To distinguish this condition the term "null locking" (as an alternative to "beam locking") may be used.

In the following, a measurement system according to an embodiment will be described which is configured for communicating with an apparatus such as the apparatus 10 and for testing it. When testing an apparatus same forms a Device under Test (DUT). Together the measurement system and the DUT form a measurement setup. It is noted that the apparatus may be any device configured for mobile communication, in particular a User Equipment (UE) or a base station (BS) also referred to as evolved NodeB (eNB) or the like. The measurement system may emulate or simulate the respective other communication partner, for example, a base station for the DUT being a UE, another UE for the DUT being a UE and/or a UE for the DUT being a base station or a base station for the DUT being a base station.

According to embodiments, alternatively or in addition, e.g., in scenarios in which the link is spatially bidirectional comprising co-located links (UL and DL), the transmit power is again to be locked in order to prevent the power management from using feedback information. For example, EIRP (equivalent isotropically radiated power or effective isotropically radiated power) measurements may use the transmitter to operate at full power.

For locking the transmission power, the calibration of adjustable front-end components (e.g., programmable attenuators, phase shifters, time delays, power amplifiers, low-noise amplifiers) used in both the transmit and receive chains may be executed. Advantageously and according to embodiments, the locking of the communication parameter such as the transmission power should be locked immediately after the beam was locked.

Further in connection with the power used for forming a beam, and as a specific extension of the power locking function, the power distribution in time, frequency and space (direction) can be selected/configured/requested in order to support specific measurements and test cases. I.e., the power/gain used for forming a beam may be set to a specific value, e.g., by a respective command and/or by generating or simulating a scenario of operation leading the apparatus to set the power or gain to a respective value. According to embodiments, the apparatus may signal the respective value of the communication parameter used, e.g., to a measurement system that transmits the locking signal 24. Such power profiles deviating from the usual constant power spectral density which is usually used in OFDM systems like LTE the power distribution in frequency domain may be uneven, e.g. a stepwise or gradual power ramp over frequency domain. A prominent example of such is the so called partial frequency reuse as a means to shape inter-cell interference between sectors illuminating the same coverage footprint. The non-equal power distribution can be generalized in the domains of time, frequency and space, e.g. in different time slots apply different power levels or use different power for beams into different directions or apply different power spectral density on different time and/or frequency resources and into different directions. The associated commands enabling such variable power profile before, during and after a measurement procedure will be described in more detail.

Alternatively or in addition to the transmission power/receive power, other parameters may be locked, for example, a Modulation and Coding Scheme (MCS) level which allows precise test in respective test cases. For example, considering test cases such as sensitivity measurements for specific MCS levels, bandwidth etc. especially in uplink, the modulation and coding scheme may be configured, selected and/or kept fixed during a measurement where power, beams with patterns and directions are kept and/or changed between iterations of a measurement.

Examples of conventional technology from 3GPP technical specifications that describe methods and procedures that implement different forms of power control are described in the following.

TS 25.141 [2]

Chapters: 6.2.3.4A Method of test for MIMO mode with four transmit antennas
   6.2.3.4A.1 Initial conditions
   Test environment: normal; see subclause 4.4.1.
   RF channels to be tested: B, M and T; see subclause 4.8
     1) Connect BS to code domain analyser as shown in annex B.1.2. Figure B.2A.
     2) Disable inner loop power control.
     3) Set-up BS transmission at manufacturer's declared rated output power per carrier, Prated,c. Channel set-up shall be according to TM2 subclause 6.1.1.2. Primary CPICH code domain power intended per antenna connector shall be declared by the manufacturer.
     4) The same BS set up is applied on antenna connectors 1, 2, 3, 4.

Subclause 6.4 gives some more information about output power dynamics including inner loop power control, power control steps, power control dynamic range, DL and UP power control.

TS 34.114 [3]

This document describes the mechanisms to get to max and min power by sending up and down power control commands to the UE in e.g. Subclause 5.4 Total Radiated Power (TRP) for TDD UE:

5.4.4.2: Procedure
   1) Send continuously Up power control commands to the UE.
   2) As the UE reaches maximum power, start sending PN15 data pattern.
   3) Position the UE against the SAM phantom.
   4) Measure the $EIRP_\theta$ and $EIRP_\varphi$ with a sample step of 15° in theta ($\theta$) and phi ($\varphi$) directions using a test system having characteristics as described in Annex A.
   5) Calculate TRP using equations from chapter 5.4.1.

TS 36.521-1 [4]
Subclause 6.3: Output Power Dynamics:
6.3.2.4.2: Test Procedure
   1. SS sends uplink scheduling information for each UL HARQ process via PDCCH DCI format 0 for C_RNTI to schedule the UL RMC according to Table 6.3.2.1.4.1-1. Since the UE has no payload and no loopback data to send the UE sends uplink MAC padding bits on the UL RMC
   2. Send continuous uplink power control "down" commands in the uplink scheduling information to the UE to ensure that the UE transmits at its minimum output power.
   3. Measure the mean power of the UE in the associated measurement bandwidth specified in Table 6.3.2.5-1 for the specific channel bandwidth under test. The period of measurement shall be the continuous duration of one sub-frame (1 ms). For TDD slots with transient periods are not under test.

Subclause 7.4A Maximum Input Level for CA:
7.4A.1.4.2: Test Procedure
   1. Configure SCC according to Annex C.0, C.1 and Annex C.3.1 for all downlink physical channels.
   2. The SS shall configure SCC as per TS 36.508 [7] clause 5.2A.4. Message contents are defined in clause 7.4A.1.4.3
   3. SS activates SCC by sending the activation MAC-CE (Refer TS 36.321 [13], clauses 5.13, 6.1.3.8). Wait for at least 2 seconds (Refer TS 36.133, clauses 8.3.3.2).
   4. SS transmits PDSCH via PDCCH DCI format 1A for C_RNTI to transmit the DL RMC according to Table 7.4A.1.4.1-1 on both PCC and SCC. The SS sends downlink MAC padding bits on the DLRMC.
   5. SS sends uplink scheduling information for each UL HARQ process via PDCCH DCI format 0 for C_RNTI to schedule the UL RMC according to Table 7.4A.1.4.1-1 on both PCC and SCC. Since the UE has no payload data to send, the UE sends uplink MAC padding bits on the UL RMC.
   6. Set the Downlink signal level for PCC and SCC to the value defined in Table 7.4A.1.5-1. Send Uplink power control commands to the UE (less or equal to 1 dB step size should be used), to ensure that for at least the duration of the Throughput measurement:

The PCC output power is within (+0 dB, −3.4 dB) of (target level in Table 7.4A.1.5-1+10 log($P\_L_{CRB}/N_{RB\_alloc}$)), for carrier frequency f≤3.0 GHz or within (+0 dB, −4 dB) of (target level in Table 7.4A.1.5-1+10 log($P\_L_{CRB}/N_{RB\_anoc}$)) for carrier frequency 3.0 GHz<f≤4.2 GHz.

The SCC output power is within (+0 dB, −3.4 dB) of (target level in Table 7.4A.1.5-1+10 log($S\_L_{CRB}/N_{RB\_alloc}$)), for carrier frequency f≤3.0 GHz or within (+0 dB, −4 dB) of (target level in Table 7.4A.1.5-1+10 log($S\_L_{CRB}/N_{RB\_alloc}$)) for carrier frequency 3.0 GHz<f≤4.2 GHz.

7. Measure the average throughput for each component carrier for duration sufficient to achieve statistical significance according to Annex G.2A.

Figure 2:
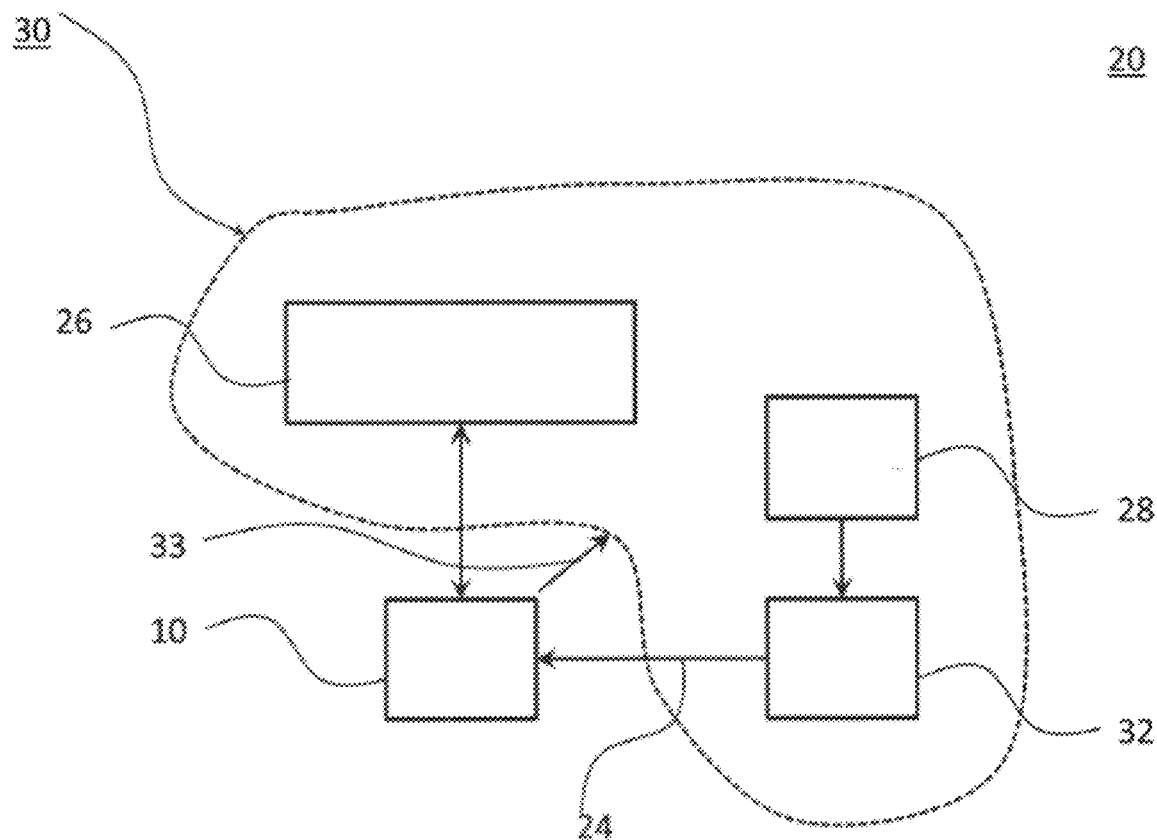
FIG. 2 shows a schematic block diagram of a measurement setup comprising a measurement system and an apparatus to be tested according to an embodiment.

FIG. 2 shows a schematic block diagram of a measurement setup 20 comprising a measurement system 30 and an apparatus to be tested, i.e., a DUT, such as the apparatus 10. Although being described as comprising a single DUT, the invention described herein is not limited hereto. According to embodiments, the measurement setup 20 may comprise a plurality of DUT, e.g., two or more, five or more, ten or more, 20 or more or even a higher number. For example, a plurality of UE may be tested with the measurement system operating as a system simulator (SS), e.g., a base station or a base station emulator. The measurement system is configured for transmitting the locking signal 24 to the apparatus 10 and for determining/measuring the characteristic of the apparatus.

The measurement system 30 comprises a measurement unit or interface 26 configured for communicating with the apparatus 10 which is configured for performing wireless communication in a wireless communications network. The measurement interface 26 may be a wired or wireless interface and is configured for controlling the apparatus 10 during a test procedure of the measurement system 30. I.e., the measurement interface may establish or utilize a measurement control channel for exchanging control information with the apparatus 10. Such a measurement control channel may be wired or wireless. The apparatus may receive control information such as the locking signal through the measurement control channel and/or may report information to the measurement system 30. For example, the apparatus 10 may report parameters used for forming beams, parts thereof and/or the beam pattern, e.g., a used transmission power, a used pattern, a direction towards a beam or lobe or null is directed or the like.

The measurement interface 26 may be configured for performing measurements of the apparatus 10, for example, a measurement parameter being described later. An example measurement parameter may be a spatial pattern of the beam pattern. Alternatively or in addition, a different entity of the measurement system 30 may be configured for such tests, e.g., one or more antenna arrays or the like.

The measurement system 30 comprises a signal generator 28 configured for generating a locking signal such as the locking signal 24, indicating a request for locking at least a part of a beam pattern and at least one communication parameter of the wireless communication in the wireless communications network, i.e., of the apparatus 10 and the wireless interface thereof. The measurement system 30 further comprises a transmission interface 32 configured for transmitting the locking signal 24 to the apparatus 10. The measurement system 30 may alternatively or in addition receive a signal 33 from the DUT, for example, with the transmission interface 32 being configured for bi-directional communication, with the measurement interface, e.g., using the tested beam, or a different interface of the measurement system. I.e., the apparatus 10 may be configured for transmitting a signal to the measurement system 30. The transmission interface 32 may be a separate interface when compared to the measurement interface 26 but may also be an interface integrated therewith, e.g., a common wired or wireless interface.

After having performed the measurement, the apparatus 10 may be instructed so as to release or unlock the part of the beam pattern, and/or the communication parameter. For example, this may be obtained by sending a dedicated unlocking signal to the apparatus 10. The signal generator 28 may be configured for generating the unlocking signal indicating a request for unlocking the locked part of the beam and/or the at least one communication parameter. It is possible but not necessary to indicate the locked part. The unlocking signal may contain general information instructing the apparatus to unlock all parts locked. Alternatively, the parts to be unlocked may be identified in the unlocking signal so as to allow for a partial unlocking. The measurement system 30 may be configured for transmitting the unlocking signal to the apparatus 10 after having determined the characteristic of the apparatus. The apparatus 10 may be configured for receiving the unlocking signal indicating a request for unlocking the at least one communication parameter and/or part of the beam pattern. The controller of the apparatus may be configured for unlocking the at least one communication parameter and/or part of the beam pattern responsive to the unlocking signal so as to comprise the variant value again. As an alternative, which may also be used in combination with the unlocking signal, the signal generator 28 may be configured for generating the locking signal 24 so as to indicate an unlocking condition, e.g., an expiring time or any other condition to be determined by the apparatus 10, that leads to an unlock of the part of the beam pattern and/or the communication parameter when occurring.

FIG. 3a shows a schematic block diagram of a measurement setup 30₁ according to an embodiment. The measurement setup 30₁ represents a concept of separated interfaces for communicating with the apparatus 10 and for controlling the behaviour thereof. For example, the measurement system 30₁ may comprise the measurement interface 27 having a measurement antenna, e.g., for centre-of-beam and/or off-centre of beam measurements. The measurement antenna 27 may implement a measurement functionality of the measurement interface 26. As a separate interface a control interface 34 may be arranged configured for steering or controlling the apparatus 10. The control interface 34 may implement the controlling functionality of the measurement interface. For example, the control interface 34 may comprise one or more link antennas for beam steering at the apparatus. For example, the control interface 34 may emulate the respective communication partner such that a determined position thereof leads the apparatus 10 during normal operation to direct the transmit beam or receive beam towards the control interface 34 wherein the measurement interface 27 may be used for determining the one or more measurement parameter. After pattern locking and locking of the communication parameter, the apparatus 10 may be moved or rotated whilst thereby leaving a relative orientation of the beam, the part thereof or the beam pattern unchanged, wherein, during normal operation, the beam would be re-located so as to track the control interface 34. This function is deactivated for a specific time using the locking signal.

Figure 3B:
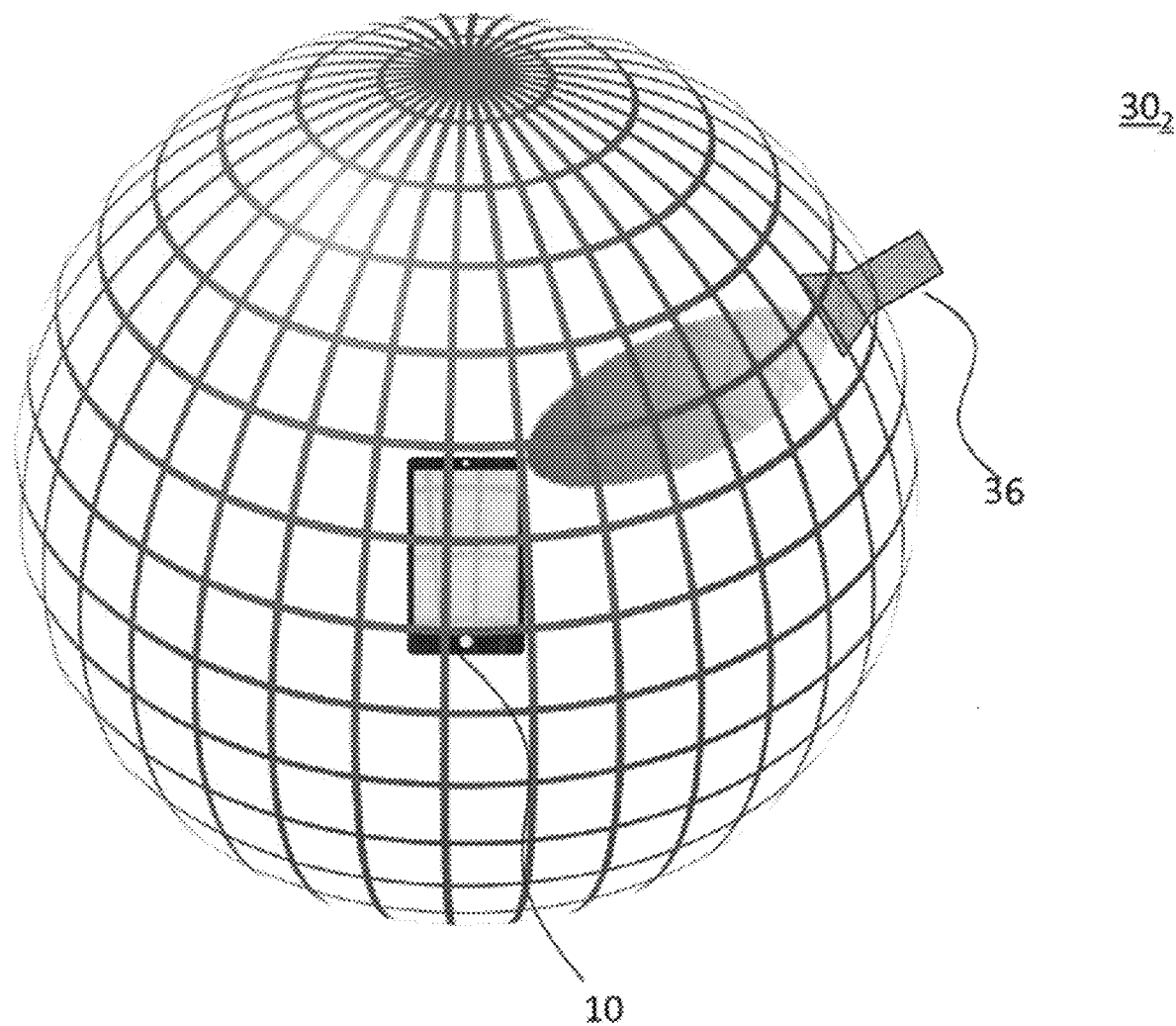
FIG. 3b shows a schematic block diagram of a measurement setup according to an embodiment having a combined interface for controlling and measuring the DUT.

FIG. 3b shows a schematic block diagram of a measurement setup 30₂ according to an embodiment having a combined interface 36 combining the interfaces 26 and 34 of FIG. 3a. The combined interface 36 may operate as a Link/measurement antenna for beam steering and centre-of-beam measurements. In other words, the FIG. 3b is a concept of a combined link-cum-measurement antenna which can be used for centre-of-beam measurements. Using the locking signal, also off-centre measurements may be done because of the apparatus 10 locking the beam even if deactivating the control interface and/or moving/rotationg apparatus 10. Thus, the measurement system may be configured for performing centre-of-beam measurements and off-centre measurements. Off-centre measurements may be enabled by locking the part of the beam and the communication parameter so as to enable a variable orientation of the DUT to the measurement antenna.

Figure 3C:
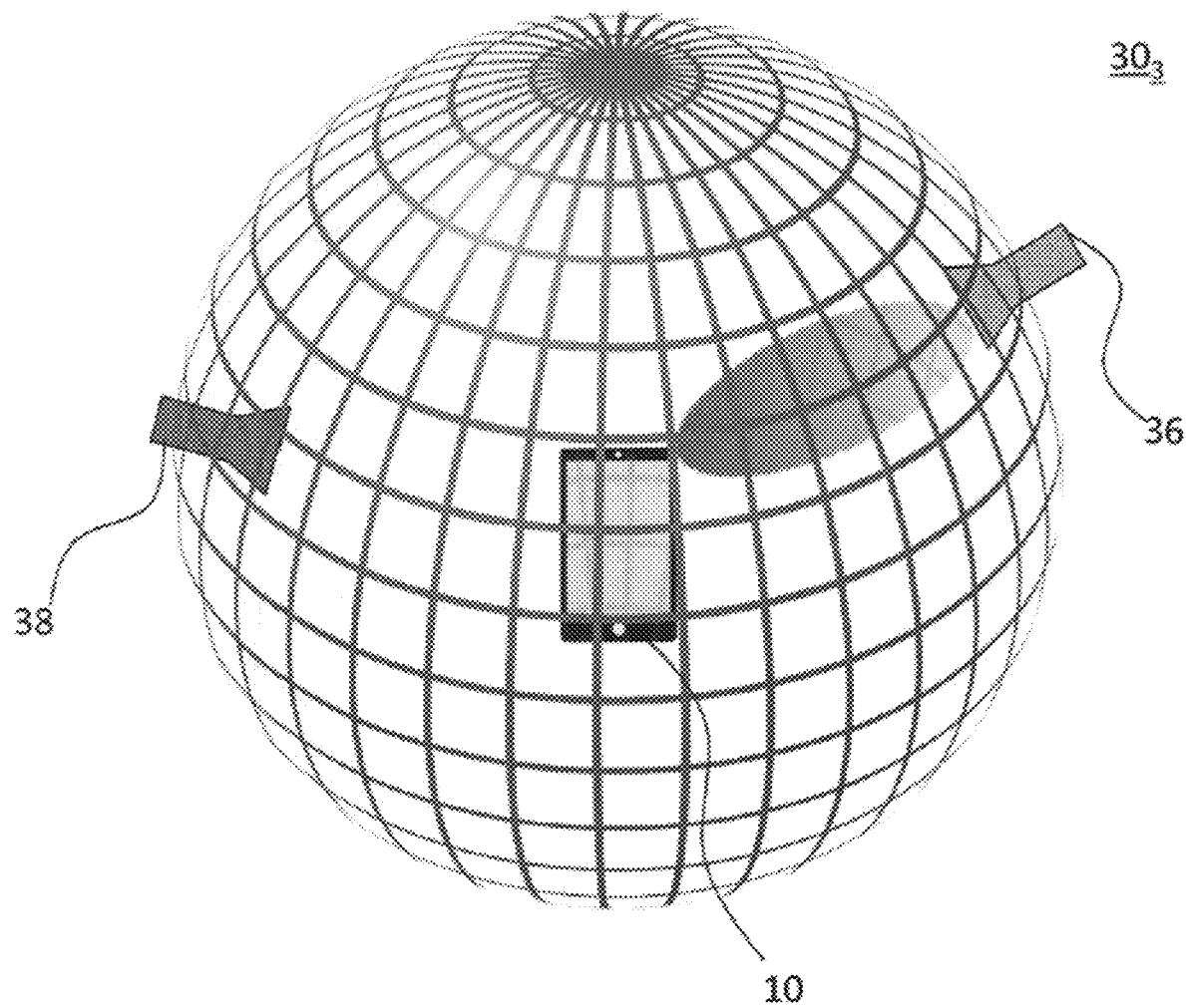
FIG. 3c shows a schematic block diagram of a measurement setup according to an embodiment extending the measurement setup of FIG. 3b by an interferer interface.

FIG. 3c shows a schematic block diagram of a measurement setup 30₃ according to an embodiment extending the measurement setup 30₂ by an interferer interface 38 which may comprise one or more interferer antennas connected to a controlled source of interference so as to interfere the wireless communication of the apparatus 10 in the measurement setup 30₃. In other words, FIG. 3c shows a concept of a combined link-cum-measurement antenna which can be used for centre-of-beam measurements and/or off-centre measurements in the presence of a controlled source of interference. In FIG. 3a separate link and measurement antennas 27 and 34 are described, wherein in FIGS. 3b and 6c, the link and measurement antennas are combined to the interface 36 which is combined with an additional interferer antenna 38 in FIG. 3c. The link-cum-measurement antenna is shown in FIGS. 3b and 3c and may be used for both establishing and maintaining the link and for making measurements.

The measurement setups 30, 30₁, 30₂ and/or 30₃ may be located inside a measurement cabin but may also be implemented in absence thereof. One or more of the measurement setups 30, 30₁, 30₂ and/or 30₃ may comprise a positioner holder 35 illustrated in FIG. 3a which may be configured for holding and/or moving/rotating the apparatus.

The measurement setup 20 may allow for precise testing of the apparatus 10. Such testing, enabled by the signalling and implementation of a respective functionality of the locking signal 24, i.e., by locking the beam at least partially and by locking the communication parameter, will be described in more detail in the following. Alternatively or in addition to the measurement system 30, the measurement setup 20 may comprise the measurement system $30_1$, $30_2$, and/or $30_3$ each comprising the not shown signal generator 28 and the transmission interface 32.

By non-limiting example, in Uplink, considering a SC-FDMA waveform, the apparatus being by way of example a User Equipment (UE) may choose a specific bandwidth (set e.g. by the scheduler (e.g., eNB tester) via the downlink control channel) and may select a specific MCS level. Depending on the chosen modulation the peak to average power ratio (PAPR) will change (e.g. PAPR of QPSK is lower than of 256 QAM) which has direct impact on the admissible output power and digital predistortion (DPD) that may be used to avoid signal distortions in-band (Error Vector Magnitude—EVM degradation) and out of band (OOB) emissions going into neighbouring resource block (RB), which may affect UE scheduled to neighbouring RBs and potentially outside of the system bandwidth used by the system (to be kept within the spectrum masks). By doing so the test case may allow to confirm that at a specific maximum output power the EVM is within spec (e.g. LTE and New Radio provide EVM limits for the transmit signal purity).

According to another non-limiting example, in Uplink, considering SC-FDMA, the apparatus being a UE may use mechanisms of carrier aggregation (CA). When using the same power amplifier (PA) the overall signal may usually become more multicarrier like and appropriate DPD and power back off have to be applied in order to meet the EVM requirements set to the modulation applied on each carrier. Furthermore, the two or more carriers aggregated may be operated at non equal power per carrier (see unequal power profile application above). Therefore, again the MCS level(s) may be selected, configured or kept LOCKED in order to apply e.g. a power ramp additionally during the measurement.

When referring now to the locking signal 24 again, generally speaking and in the context of electrical engineering, the word "command" suggests a recognized instruction that is communicated using a defined method (such as a protocol). Here it may be of advantage that the entity sending the command (e.g., a measurement system) and the entity receiving the command (e.g., the apparatus 10) share a common understanding of the command or in other words, the entities share a common "language" or message space. On the other hand, and again within the context of electrical engineering, a "function" suggests that an entity has the means of configuring itself in a given way in order to work or operate in a proper or particular way. Viewed in this way, a "command" and a "function" may be understood as different concepts.

Some embodiments on what this function may implement are listed as follows:
   Deactivate beam (and null) tracking
   Deactivate beam (and null) sweeping
   Freeze beam for time x
   Freeze null for time x
   Freeze beam b for time x
   Freeze null n for time x
   . . .

In practice, a respective command may be implemented as:
   1. a control signal to analogue components (for example to return phase shifters and attenuators to a reference state)
   2. a control signal to baseband circuit/module/system/processor that use digital techniques to create beams
   3. a combination of control signals used that instruct/control both analogue and baseband processor Examples of commands used within the functions may include without completeness in the command/message space:
   1. lock/release
   2. prepare to . . .
   3. do until . . .
   4. do after . . .
   5. lock for certain time and then release . . .
   6. set parameters to value . . .
   7. . . . .

An example of a parameter to be set may be a Power Spectral Density (PSD) which may be instructed to be set to a specific value or level for one or more beams, e.g., according to "lock beam #3 of possible beams #1 to #8 at PSD level #4", wherein neither the identifier nor the amount of beams shall be interpreted as limiting the embodiments hereto. It should be noted that a signal is not limited to include at least one of electrical, optical, acoustical, mechanical components and hybrid combinations therefor. It should also be noted that analogue components include those operating at intermediate frequencies (IF), low IF, and radio frequencies (RF).

Although the above discussion includes the term "beam lock" this does not exclude the other entities, e.g., communication parameter(s) that can be locked as described above. In the following, examples of signalling information transmitted to the apparatus, i.e., the Device under Test (DUT/UE) with respect to the beam lock and/or a lobe lock and/or a null lock is given.

EXAMPLE 1 FREEZE BEAM/NULL AND RELEASE BEAM/NULL, FREEZE POWER AND RELEASE POWER i. Free running beam and Nulls: a communication partner (tester, UE, BS) in normal operations establishes a connection to the apparatus, e.g., being a DUT
ii. Sending a freeze Tx power (communication parameter) command to DUT
iii. Sending freeze beam and or freeze null command (beam) to DUT
iv. Executing measurement of certain metrics, measurement parameters at the tester/UE/BS (e.g. TRP of DUT, RTP, . . . ), the exchange of the measured parameters can be over several interfaces (e.g. standard communication protocol, USB, direct connect to the DUT, any kind of memory)
v. Changing something in the measurement setup, e.g.: rotation of DUT, direction of generated interference, power of tester, power of interference, direction of interference, etc.
vi. Repeating step iv and step v, e.g., iteratively in a loop until all wanted constellations/scenarios are measured
vii. Signalling an unfreeze beam and/or unfreeze null command (or free running beam command) to the DUT
viii. Repeating the described steps ii to vii for different wanted settings Alternatively or in addition to step vii, the apparatus may be configured for receiving an unlocking signal indicating a request for unlocking the at least one communication parameter. The controller may be configured for unlocking the at least one communication parameter responsive to the unlocking signal so as to comprise a variant value again, e.g., during normal operation. This may allow for adjusting the beam between single measurements. The controller may further be configured for unlocking the beam responsive to the unlocking signal.

Alternatively or In addition to the above the signalling or the freeze beam command may include an identifier for the beam b or and null n to be selected while other beams unequal b and or nulls unequal n are switched off and/or normal operation is continued. According to embodiments, the locking signal may comprise information indicating at least one of a plurality of lobes or one of a plurality of nulls of the beam, wherein the apparatus is configured for locking the lobe or null indicated and for disabling at least one lobe or at least one null different from the indicated lobe or null responsive to the locking signal.

EXAMPLE 2 FREEZE BEAM/NULL WITH ADDITIONAL SIGNALLING INFORMATION DURATION OF FREEZE i. Free running beam and Nulls: a communication partner (tester, UE, BS) in normal operations establishes a connection to the apparatus, e.g., being a DUT
ii. Sending a freeze Tx power (communication parameter) command to DUT
iii. Sending freeze beam and or freeze null command for duration of a specific time to DUT, e.g., a number of seconds, minutes or the like
iv. Executing measurement of certain metrics, measurement parameters at the tester/UE/BS (e.g. TRP of DUT, RTP, . . . ), the exchange of the measured parameters can be over several interfaces (e.g. standard communication protocol, USB, direct connect to the DUT, any kind of memory)
v. Changing something in the measurement setup, e.g.: rotation of DUT, direction of generated interference, power of tester, power of interference, direction of interference, etc.
vi. Repeating steps iv and v, e.g., iteratively in a loop until all wanted constellations/scenarios are measured
vii. Repeating the described steps ii to vi for different wanted settings For implementing example 1 and/or 2, different signalling may be implemented. Unlocking may be implemented by indicating a duration of locking, e.g., with the locking signal.

In example 1, the locking signal may comprise information indicating a request to freeze the communication parameter for certain time, i.e., the method may comprise instructing the apparatus so as to lock at least one of the beam and the communication parameter using a time information indicating a duration of locking such that the beam and/or the communication parameter is unlocked after the time duration;

In example 2, the locking signal may comprise information indicating a request to freeze beam and or null of number n/b for certain time.

I.e., different versions of signalling may be implemented, for example, "Freeze power for certain time xx", "Freeze beam b and/or null n for certain time x" or the like. I.e., apparatus or the controller may be configured for unlocking the at least one communication parameter after a time duration indicated by a duration information contained in the locking signal. Alternatively, the unlocking may be obtained by sending a respective unlocking signal, i.e., transmitting an unlock signal to the apparatus indicating information that the apparatus is requested to unlock the beam and/or the communication parameter.

In the following, a specific Example of a Test/Measurement Routine according to an embodiment is given. During the measurement one or more measurement parameters may be measured, for example, a beamformed pattern, i.e., a spatial distribution of beam, parts thereof, e.g., a size or width of a beam or lobe thereof or null of the beam, and/or beam patterns, of a TRP (total radiated power), a RTP (Received total power), a spatial distribution of a transmission power in at least a part of the beam; a spatial extension of the beam; a stability of a beam direction and/or a null direction; an out of band (OOB) radiation; an adjacent channel leakage ratio (ACLR); a beam tracking performance; a null tracking performance; a total radiated power; a total received power; a Modulation and coding performance; an error vector magnitude (EVM), a spurious emissions measurement or the like. The TRP may be measured based on RSSI (Received Signal Strength Indicator) and/or RSRP (Reference Signal Received Power). The embodiment is described in different versions differing from each other in view of the signalling implemented.

Version 1:
i. Free running beam, a communication partner (tester, UE, BS) located in a defined direction, DUT is placed on positioner at angle_1 (azimuth and elevation pair, polarization)
ii. Sending a Freeze beam command to DUT
iii. Measuring the measurement parameter such as complex beamformed pattern/TRP/RTP at communication partner (Tester, UE, BS) for angle_1 (azimuth and elevation pair, polarization), see above
iv. Rotating or moving DUT around (e.g., by angle_1 as centre) to measure off main beam directions TRP
v. Changing angle_1 to next angle, sending an unfreeze beam command (or free running beam command) to the DUT
vi. Sending a Freeze beam command to DUT and measuring the measurement parameter such as complex beamformed pattern/TRP/RTP around the new angle_1 or the like as described before
vii. Repeating the described steps until the intended angular and polarization coverage area of the DUT is achieved Version 2:
i. Free running beam, a communication partner (tester, UE, BS) located in a defined direction, DUT is placed on positioner at angle_1 (azimuth and elevation pair, polarization)
ii. Sending a Freeze beam command to DUT and signalling the duration of freeze/lock beam command for time xx
iii. Measuring the measurement parameter such as complex beamformed pattern/TRP/RTP at communication partner (Tester, UE, BS) for angle_1 (azimuth and elevation pair, polarization) or the like
iv. Rotating or moving DUT around (angle_1 as centre) to measure off main beam directions TRP
v. Changing angle_1 to next angle, sending a freeze beam command to DUT and signalling the duration of freeze/lock beam command for time xx vi. Measuring the measurement parameter such as complex beamformed pattern/TRP/RTP around the new angle_1 or the like as described before
vii. Repeating the described routine from steps i to vi until the intended angular and polarization coverage area of the DUT is achieved It is to be noted that the respective time information according to Version 2 may be transmitted as part of the locking signal and/or as a separate signal. When referring to the locking signal, being generated, for example, by a signal generator of a measurement system, comprising a duration information indicating the time duration xx of locking the beam and/or the at least one communication parameter, this is equivalent to transmitting the locking signal and a further signal indicating the time duration.

According to an embodiment, the signaling or the lock beam command (locking signal) may be generated so as to include a beam information, e.g., an identifier indicating one of a plurality of beams of a beam pattern, e.g., the beam n to be selected while other beams unequal n are indicated to be switched off. The apparatus may follow the respective instructions and may switch off the beams. Alternatively, the signaling or the locking signal may be generated so as to indicate specific beams to be switched off. According to an embodiment, the same procedure may be applied alternatively or in addition, for nulls, meaning interference is generated in a certain beam direction by the tester and is locked too after a lock null command for the $n^{th}$ null. Alternatively or in addition, the signal generator may be configured for generating the locking signal and/or unlocking signal so as to comprise beam pattern information indicating at least a part of a beam or a null to be locked or unlocked.

A further example measurement procedure or method will be described in the following. The following procedure addresses the UE as the DUT while providing the base station (gNB) emulator as part of the test setup, however, these parts are interchangeable, e.g., if the base station (gNB) is the network entity has to be tested.

Procedure:
 i. Placing a UE (apparatus, DUT) in the test position—most likely to be mount on a positioner holder
 ii. Positioning a gNB (base station) emulator as part of the measurement setup away from the DUT, e.g., considering the minimum splitting distance that will be defined by 3GPP WR4 community
 iii. Operating the measurement setup such that a Cell identification procedure occurs and a link is established between the UE and the gNB emulator
 iv. Operating the measurement setup such that through the test interference the gNB executes the pattern locking routine, within this routine one or combination of the following commands can be executed
 v. Fixing the configuration of beamform involved components at the transmitter—the analog beamforming parts, or the digital ones, or both simultaneously
 vi. Locking the receiver beam in similar way as it for Tx part (as described in v)
 vii. Locking the receiver beam to omni or quasi-omni pattern in order to keep active connection to the gNB emulator—while the UE is rotated
 viii. Sending continuously up-power control commands to the UE, such that UE reaches maximum transmit power. In practice, this may be done by increasing the attenuation level at the gNB RF input in a way it forces the UE to increase its transmit power without specific function has to be signalled/executed)
 ix. Disabling the power controlling loop at the UE (inner, outer or even both inner and outer)
 x. Measuring the radio frequency (RF) power through an antenna that is attached to the gNB emulator. A switch box can be used to route the received signal to measurement equipment instead of the gNB emulator to assure more accurate measurement.
 xi. Rotating the DUT to scan all the points on a (uniform/non-uniform) spherical grid and measure at each point
 xii. Using the collected measurements to calculate the TRP value and determine the accurate EIRP, which may be deviated from the one measured at home axes
 xiii. Validating the presence of the beam main lobe at the home axes right after reaching it. This allows to make sure that nothing had corrupted the measurement procedure
 xiv. Signalling the UE to disable pattern locking, e.g., by use of an unlock signal or a time information in the locking signal
 xv. [optional step] Repeating the procedure for all available (supported-by-the-UE) beam indices or the ones of interest; alone or in combination.

After having locked the beam and the communication parameter, one or more measurements may be performed, i.e., measurement parameters may be measured or determined. For example, once the beam is locked, one or more of the following examples of radio frequency (RF), radio resource management (RRM), demodulation and protocol testing are performed:

RF Transmitter Measurements: Compare against limits or minimum requirements
  a. Example: Spectrum Emission Mask, Error Vector Magnitude (EVM), out of band emissions . . . (see power & MCS locking as well)
RF Receiver performance (demodulation) Measurements
  a. Sensitivity and Selectivity (e.g. adjacent and co-channel rejection, blocking)
    (1) For example, using power and/or MCS locking
  b. Throughput vs. SNR (AWGN channel simulation)
  c. Simulation of Multipath environments and traffic scenarios
RRM Tests: Basic behaviour in a cellular radio environment
  a. Cell selection/reselection
  b. Handover
  c. Radio reporting functions
Protocol Tests
  a. Check default protocol sequences and failure behaviour
  b. Call setup, call release, channel parameter changes . . . etc.

Figure 4A:
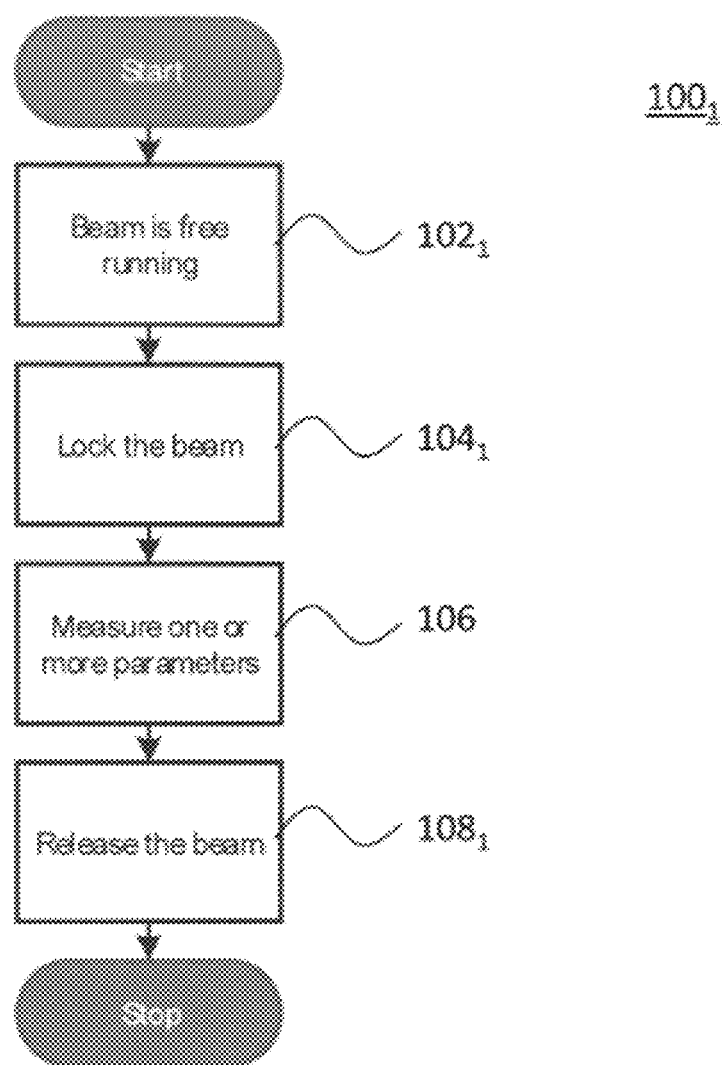
FIGS. 4a-4f show schematic flowcharts of methods for testing an apparatus according to embodiments.

FIGS. 4a to 4f show schematic flowcharts of methods for testing an apparatus such as the apparatus 10. The flowcharts describe how a single measurement may be performed during combinations of beam and/or null locking. FIGS. 5a and 5b show schematic flowcharts of methods for performing multiple measurements for which the beam and/or null is locked more than once, perhaps in different directions. The flowcharts illustrate that either a "release command" or a "fix beam and/or null for time Tn/time duration x" command can be sent after the measurement has been made. The described methods therefore also apply to the discussed locking of one or more communication parameters, e.g., power locking and/or MCS locking commands and any combinations of those together or apart from the pattern locking command FIG. 4a shows a schematic block diagram of a method $100_1$ for testing an apparatus according to an embodiment.

The method comprises a step $102_1$ in which the apparatus is controlled according to a normal or regular operation, i.e., the beam is "free running" and may track or be directed with at least one lobe towards a respective sending or receiving communication partner.

In a step $104_1$ the beam or at least a part thereof may be locked which includes a lock of the communication parameter. This may be done sending the locking signal to the apparatus. I.e., a method for testing an apparatus according to embodiments comprises transmitting, to the apparatus, a locking signal indicating a request for locking a beam and at least one communication parameter of the apparatus. The method further comprises locking the beam and the at least one communication parameter responsive to the locking signal. The beam and/or the communication parameter may be set to s specific configuration or value. Alternatively and based on a report of the apparatus reporting the beam configuration and communication parameter used, a wanted configuration may be awaited and then locked. Alternatively, the apparatus may be provoked to control itself into a specific configuration, e.g., when using a respective control interface emulating a specific scenario such as a position, distance or link quality to the communication partner. According to an embodiment, the measurement system may be configured for controlling the apparatus so as to generate a beam during its normal operation according to a predefined setting, i.e., provoking it, The measurement system may be configured for transmitting the locking signal so as to maintain the predefined setting and to pause alterations in the beam caused by normal operation.

In a step 106 measurements of one or more parameters may be done, i.e., the measurement parameters may be measured or determined. I.e., after having transmitted the locking signal, the measurement system may be configured for determining a characteristic of the wireless communication performed by the apparatus. In a step $108_1$ the beam and/or the communication parameter is released or unlocked, e.g., using the unlocking signal.

In other words, FIG. 4a shows an example of a pattern locking process applied to a single measurement.

Figure 4B:
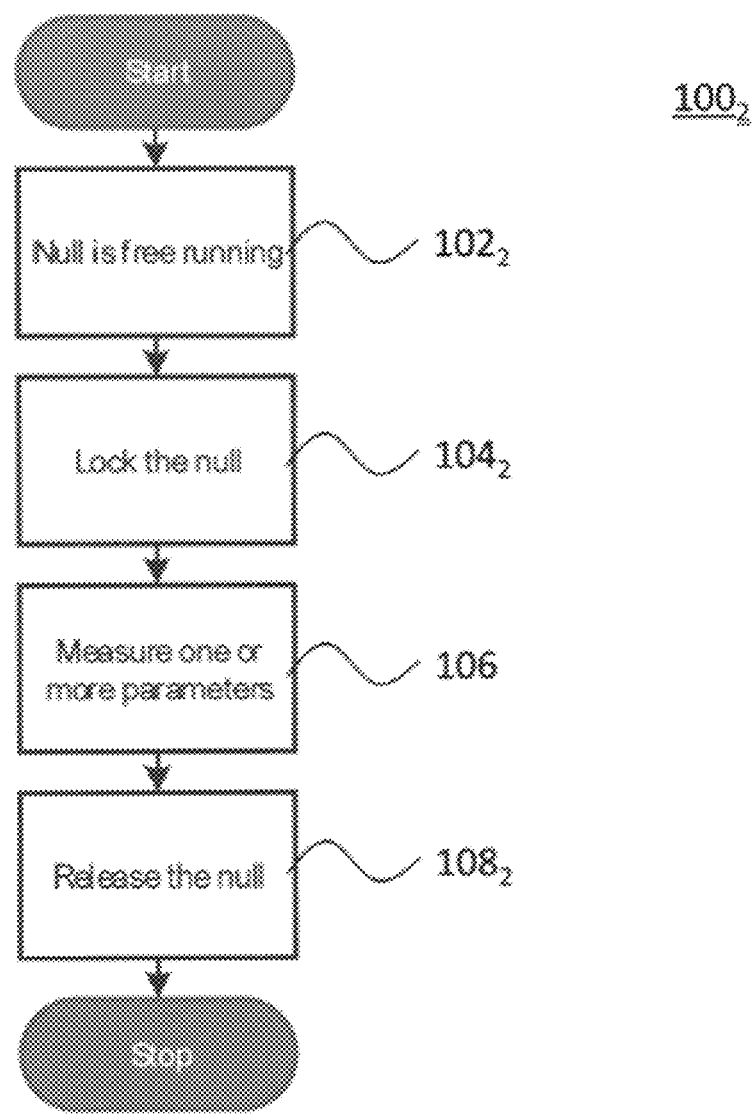
Figure 5A:
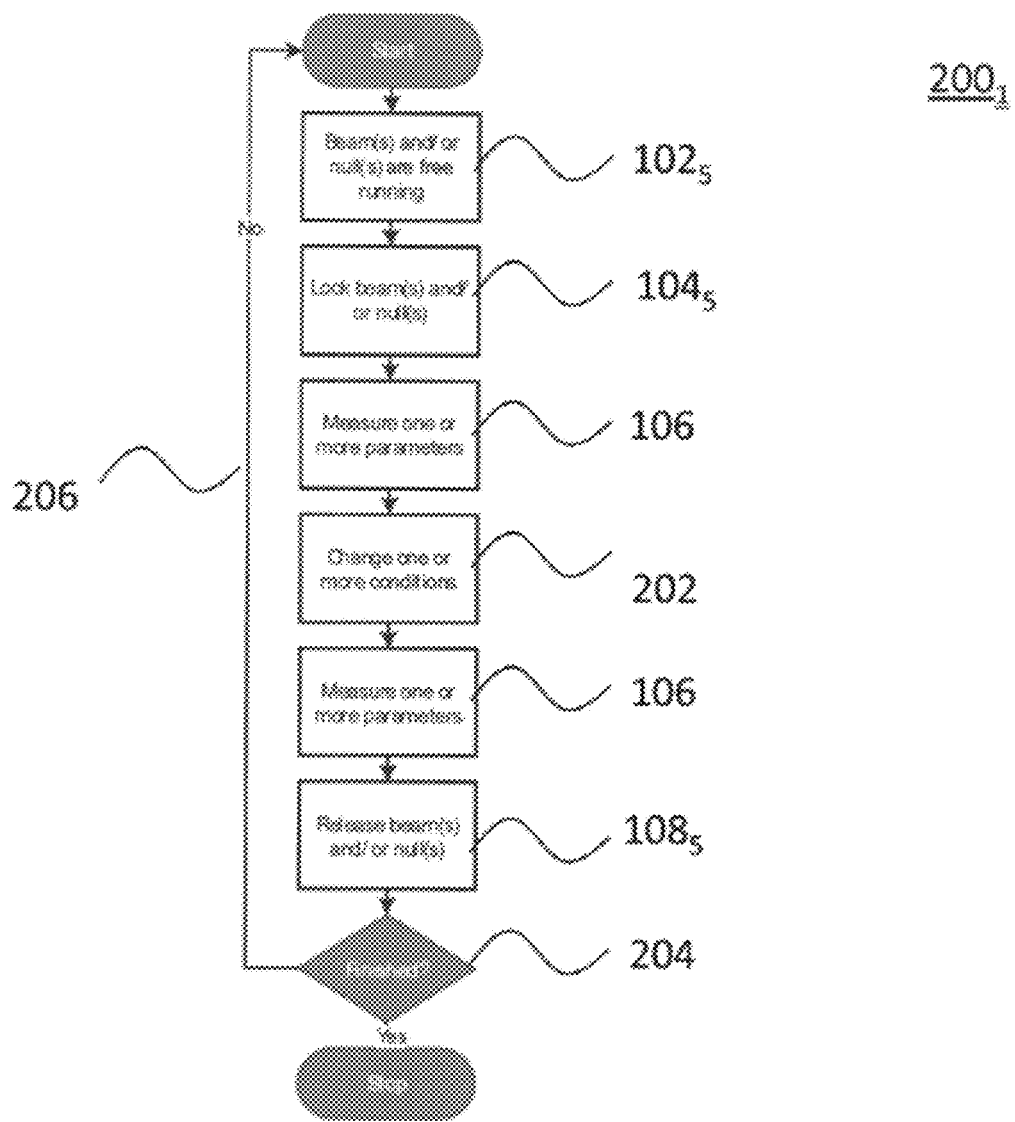
FIG. 5a shows a schematic flow chart of a method for repeatedly measuring the DUT according to an embodiment.
Figure 5B:
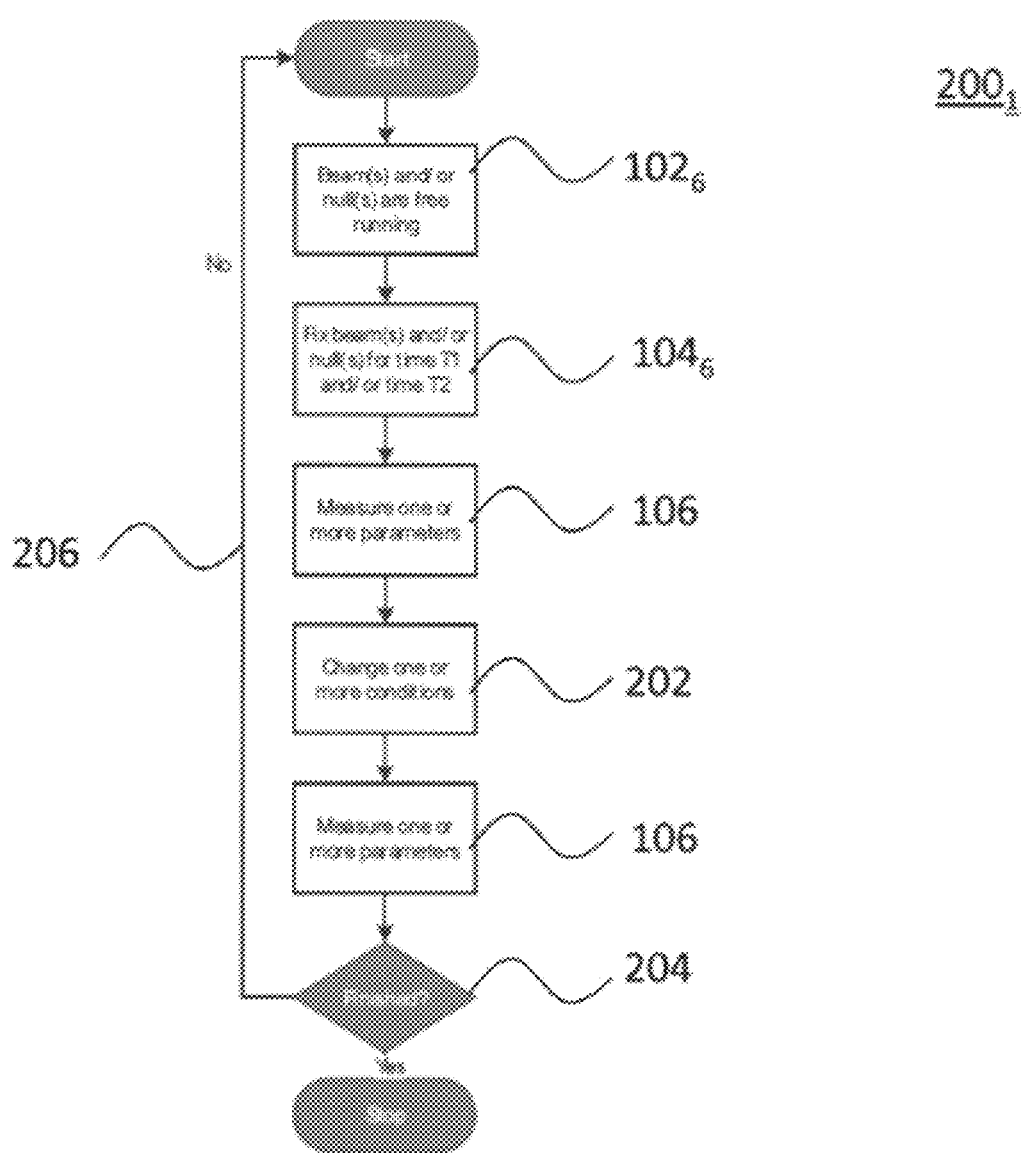
FIG. 5b shows a schematic flow chart of another method for repeatedly measuring a DUT according to an embodiment.

FIG. 4b shows a schematic flowchart of another method $100_2$ for testing the apparatus according to an embodiment being directed in which at least one null is locked. In a step $102_1$ the apparatus is controlled so as to have a free running null. A null may be directed towards a further node in the cell which is aimed to be spared from interference. Thereby, for example and when referring again to FIG. 3a, the control interface 34 may also emulate such a node, e.g., a UE, thereby controlling the apparatus 10 to point a null towards the control interface 34.

In a step $104_2$ the null is locked as described with respect to step $104_1$ but in connection with the null.

The step 106 may be performed to execute the measurements.

The method $100_2$ comprises a step $108_2$ in which the null is released, probably after the measurements have been made.

In other words, FIG. 4b shows an example of a null locking process applied to a single measurement.

Figure 4C:
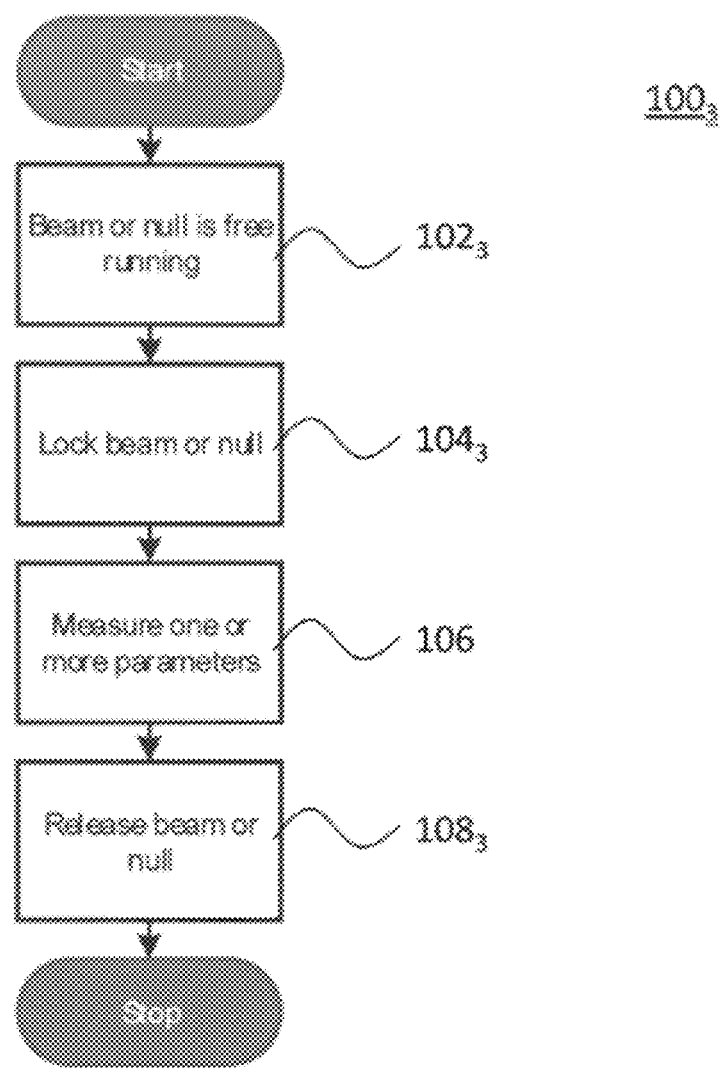

FIG. 4c shows a schematic flow chart of a method $100_3$ according to an embodiment in which steps $102_3$, $104_3$ and $108_3$ are formed as an OR-combination of the steps $102_1$ and $102_2$, $104_1$ and $104_2$, $108_1$ and $108_2$ respectively.

In other words, FIG. 4c shows an example of a beam or null locking process applied to a single measurement.

Figure 4D:
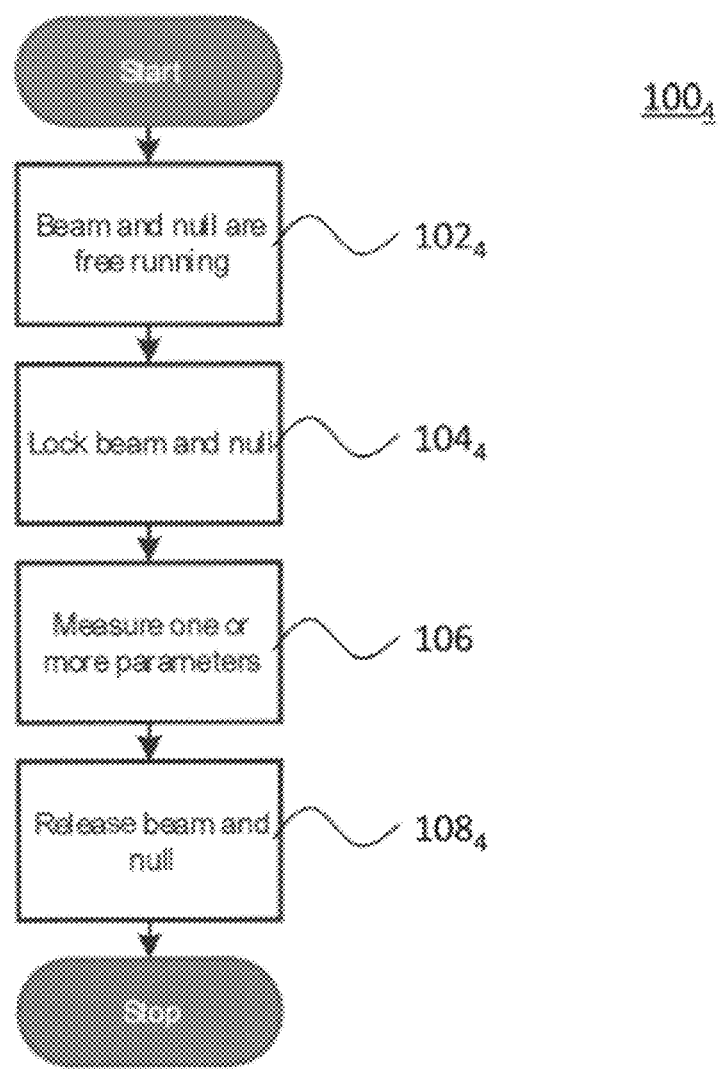

FIG. 4d shows a schematic flow chart of a method 1004 according to an embodiment in which steps $102_4$, $104_4$ and $108_4$ are formed as an AND-combination of the steps $102_1$ and $102_2$, $104_1$ and $104_2$, $108_1$ and $108_2$ respectively.

In other words, FIG. 4d shows an example of a beam and null locking process applied to a single measurement.

Figure 4E:
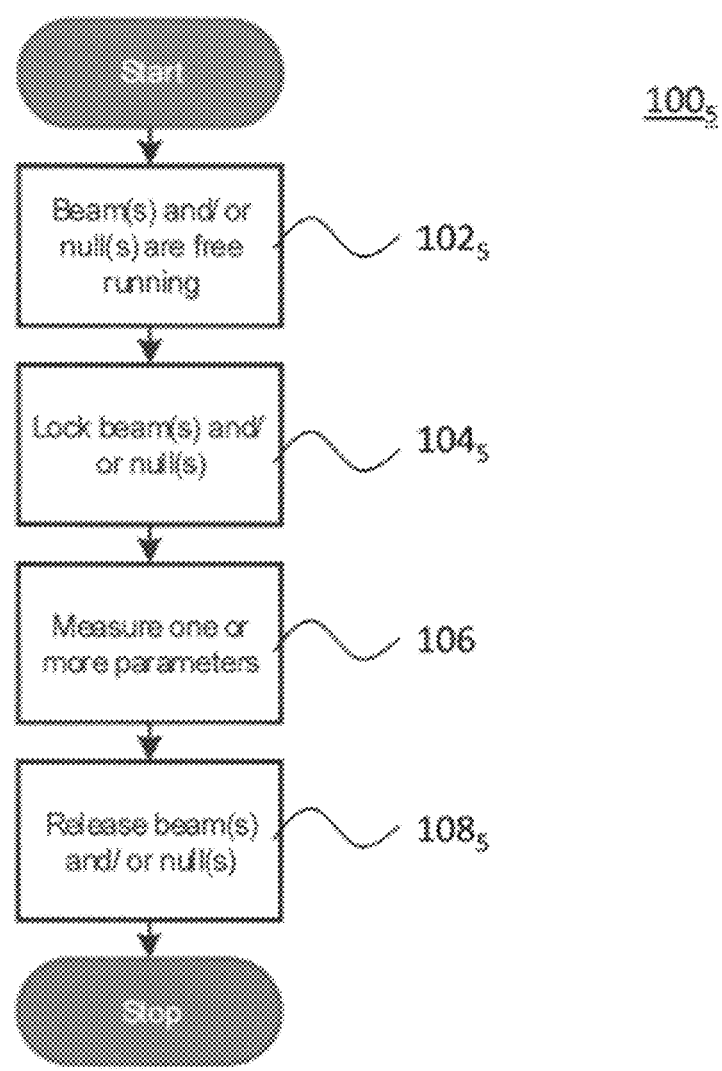

FIG. 4e shows a schematic flow chart of a method $100_5$ according to an embodiment in which steps $102_5$, $104_5$ and $108_5$ are formed as an AND/OR-combination of the steps $102_1$ and $102_2$, $104_1$ and $104_2$, $108_1$ and $108_2$ respectively and directed to a single beam and/or null or a plurality thereof.

In other words, FIG. 4e shows an example of a generalized beam/null locking process applied to a single measurement.

Figure 4F:
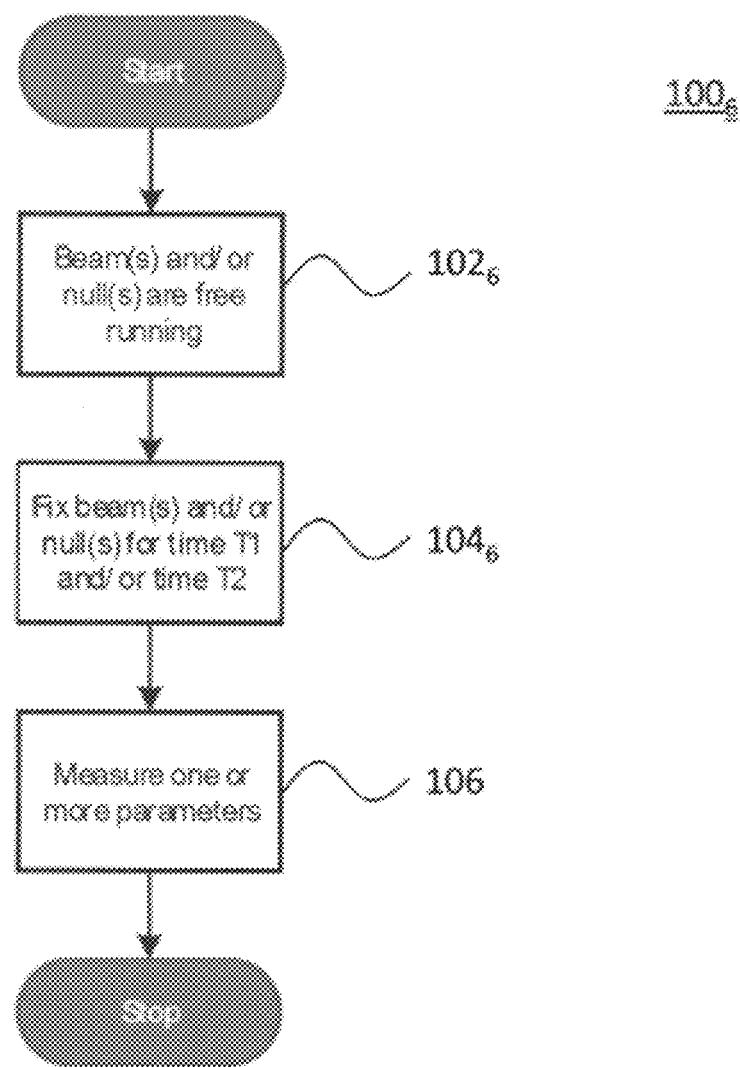

FIG. 4f shows a schematic flow chart of a method $100_6$ according to an embodiment which is amended with respect to method $100_5$. The locking signal may indicate a request to lock the at least one beam for a certain time T1 and/or the at least one null for a certain time T2, wherein T1 may be equal to T2 but may also be different. In step $104_6$ the beam(s) and/or null(s) are fixed/locked accordingly. In step 106 the one or more parameters may be measured, advantageously before times T1 and T2 end. Based on the indicated times, step 1086 may be skipped because the beam(s) and/or null(s) are released after the times T1 and T2 have elapsed.

In other words, FIG. 4f shows an example of a generalized beam/null locking process for fixed time periods applied to a single measurement.

The methods of FIGS. 4a to 4f allow for measuring a condition of a locked beam, lobe, null or beam pattern. It may be desired to measure a plurality thereof. This may be obtained by repeating the methods and/or by allowing a changed state of the beam, part thereof or beam pattern. This is illustrated in the embodiments of FIGS. 5a and 5b.

FIG. 5a shows a schematic flow chart of a method $200_1$ having the steps $102_5$, $104_5$ and 106 as described in connection with method $100_5$. After having measured the one or more measurement parameters, a step 202 is performed in which one or more conditions are changed. The conditions may refer to the beam, i.e., it may be altered or temporarily unlocked, and/or to the communication parameter. Then the measuring 106 may be executed again. Step 202 and 106 may be present for any suitable number, i.e., the condition may again be changed (for any suitable number) and may be followed by a measurement and before step $108_5$ is performed. After step $108_5$ and/or before step $108_5$ a step 204 may be performed in which it is checked, if the end of the test is reached. If this is not the case, the mentioned steps may be repeated, i.e., a loop 206 may be executed leading to the beginning or at least to a condition in which step 106 and/or 202 is again executed.

In other words, FIG. 5a shows an example of a generalized beam/null locking process applied to multiple measurements.

FIG. 5b shows a schematic flow chart of a method $200_2$ having the steps $102_6$, $104_6$ and $10_6$ as described in connection with method $100_6$. After having measured the one or more measurement parameters, the step 202 is performed in which one or more conditions are changed. The conditions may refer to the beam, i.e., it may be altered or temporarily unlocked, and/or to the communication parameter. Then the measuring 106 may be executed again. Step 202 and 106 may be present for any suitable number, i.e., the condition may again be changed (for any suitable number), advantageously the indicated times T1 and T2 have elapsed because after those times, the beam(s) and/or null(s) may return to the status "free running", unlocked respectively. Unlocking the beam(s) and/or null(s) and/or after the step 106 a step 204 may be performed in which it is checked, if the end of the test is reached. If this is not the case, the mentioned steps may be repeated, i.e., a loop 206 may be executed leading to the beginning or at least to a condition in which step 106 and/or 202 is again executed.

In other words, FIG. 5*b* shows an example of a generalized beam/null locking process for fixed time periods applied to multiple measurements.

The pattern locking, in particular the beam locking function is tightly related to beamforming configuration and may be separated for transmitting (Tx) and receiving (Rx) involved components in the transceiver in a case where the beam pattern comprises receive beams and transmit beams, i.e., beams for transmission and beams for reception. According to embodiments, the test procedures are executed such that during one or more first instances a transmission/sending beam is measured and locked, probably whilst deactivating the receiving beam(s) and during at least one second instance the receive beam is activated and locked whilst the transmission beam is probably deactivated. Another feature is related to the Rx part and comprises locking the configuration of the Rx-beamforming-related components and/or related communication parameters so as to lock the receive beam and measure the receive beam pattern. The results may then be retrieved via a test interface channel that may be established between the measurement system and the apparatus, e.g., using the measurement interface 26 or another interface. The aforementioned feature may be repeated several times in order to collect all possible Rx beamforming configurations, i.e., different beamforming patterns. This measured beam patterns may be used for many test setups such as the radiated-two-stage method. According to embodiments, the method 100 may be performed such that the apparatus is operated such that it forms a beam pattern comprising a transmission beam and a receiving beam. I.e., the beam may be the transmission beam or the receiving beam and may be overlapped or superimposed with a beam of the other kind. The method may comprise transmitting the locking signal as a first locking signal so as to instruct the apparatus to lock the transmission beam and to deactivate the receiving beam or to lock the receiving beam and to deactivate the transmission beam. I.e., only one of the two beams is active and locked, wherein this does not exclude the presence of further beams, especially of beams of a same kind. The method comprises measuring the locked beam. Further, the method comprises transmitting a second locking signal so as to instruct the apparatus to activate and lock the receiving beam and to deactivate the transmission beam or to activate and lock the transmission beam and to deactivate the receiving beam. This may be understood as swapping beams, e.g., some or all of the previously deactivated beams are activated. E.g., when having first measured the receive beams, then in the second iteration the transmission beams may be active and locked or vice versa. The method further comprises measuring the locked beam.

Figure 5C:
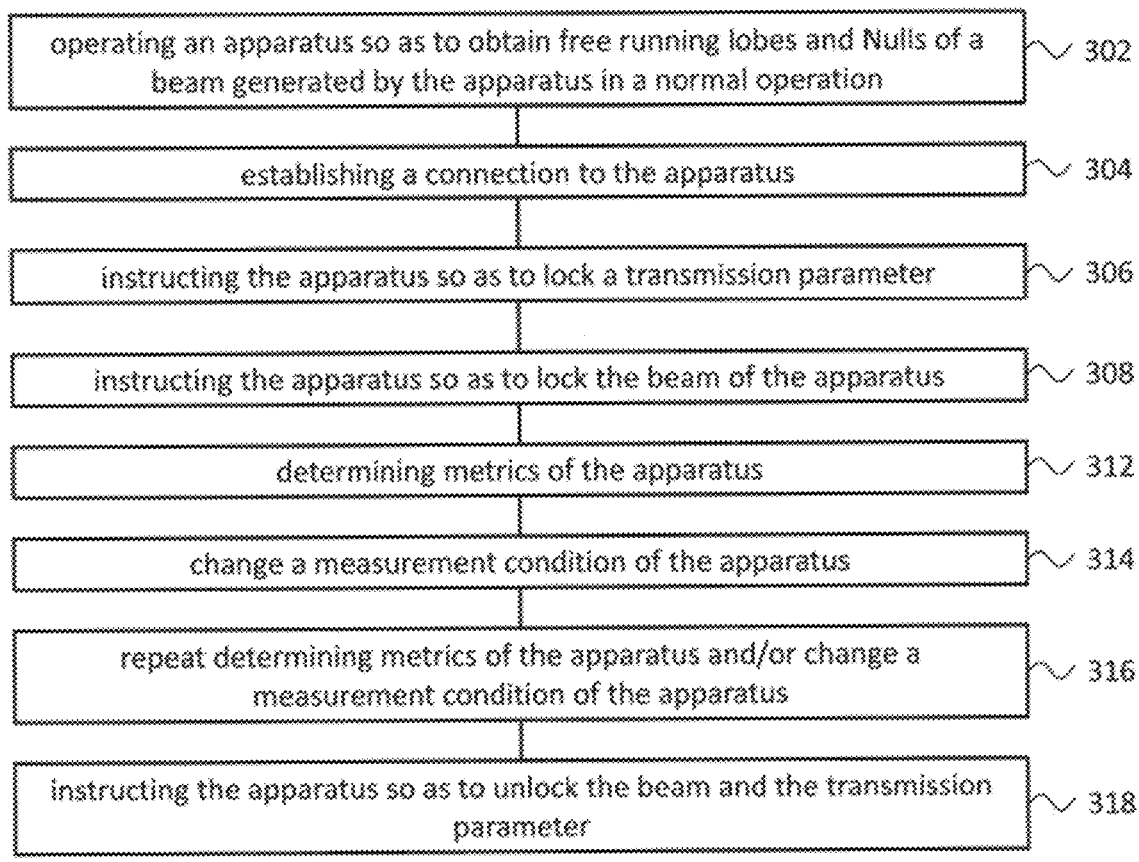
FIG. 5c shows a flowchart of a general method according to an embodiment, for testing an apparatus with a plurality of measurement.

FIG. 5*c* shows a flowchart of a general method 300 according to an embodiment, for testing an apparatus with a plurality of measurement conditions obtained, for example, with step 202.

A step 302 comprises operating an apparatus so as to obtain free running lobes and Nulls of a beam generated by the apparatus in a normal operation, e.g., by using step 102. A step 304 comprises establishing a connection to the apparatus. A step 306 comprises instructing the apparatus so as to lock a communication parameter, for example, by sending the locking signal to the apparatus in step 104$_i$. A step 308 comprises instructing the apparatus so as to lock the beam of the apparatus, for example, by sending the locking signal to the apparatus in step 104, and/or by transmitting a separate signal which is equivalent. A step 312 comprises determining metrics of the apparatus, e.g., performing measurements in step 106. A step 314 comprises a change of a measurement condition of the apparatus, e.g., a change in the beam, a part thereof and/or in the beam pattern and/or in the communication parameter as described, for example, in connection with step 202. A change may also refer to activate and/or deactivate other lobes or nulls than the ones measured in step 312. A step 316 comprises repeating determining metrics of the apparatus and/or change a measurement condition of the apparatus, i.e., steps 312 and/or 314 may be repeated. It is noted that such a repetition may be executed more than once, for example, as often as different configurations of the apparatus are to be measured. Alternatively, step 316 may be omitted. A step 318 comprises instructing the apparatus so as to unlock the beam and the communication parameter.

According to an embodiment, locking of a part of the beam may also include deactivation of unlocked parts thereof. When changing the measurement condition, other parts may be locked, therefore activated whilst active parts of the beam become deactivated. This may be understood as sweeping through the parts of the beam. Such a pattern locking concept may relate to a single (pencil) beam which can be easily visualized. Such a beam may be the main lobe of an antenna's radiation pattern for example when a link is established with a single user. According to embodiments, multi-user scenarios are introduced such that more than one beam may be locked in order to assess the performance of equipment that is designed to service multiple users simultaneously. According to such embodiments, the apparatus may be implemented such that the beam formed comprises a plurality of lobes and/or a plurality of nulls between the lobes. The apparatus may be configured for variably over time deactivating at least a first lobe or null during a first time interval and for deactivating at least a second lobe or null during a second time interval responsive to the locking signal.

As described, this may be obtained, for example, by using a dedicated unlocking signal or automatically, e.g., by instructing the apparatus to lock the beam and/or communication parameter until a certain condition is obtained, e.g., a time interval indicated is elapsed, the apparatus has turned for a dedicated angle such as 360° or has set every parameter/condition to be tested at least once. I.e., Instructing the apparatus so as to unlock the beam and the communication parameter may comprise instructing the apparatus so as to lock at least one of the beam and the communication parameter using a time information indicating a duration of locking such that the beam and/or the communication parameter is unlocked after the time duration Alternatively or in addition, instructing the apparatus so as to unlock the beam and the communication parameter may comprise transmitting an unlock signal to the apparatus indicating information that the apparatus is requested to unlock the beam and/or the communication parameter.

Thus, in addition to locking the beam, further parameters may be locked. This may include various parameters in addition or as an alternative to beam locking per se, being directed to the locking of the (main) beam or lobe in a given direction (boresight) in order to perform specific tests.

According to embodiments, such concepts are extended so as to generate new use cases and test cases. By non-limiting example, this may include:
  Prepare to lock beam/null, i.e., to generate a state or condition of the DUT to be locked Prepare to lock a specific beam or a specific combination of beams, e.g., beam 1, beam 2 or beams 1 to N
    Definition of "beam sequence lock with specified time period" command (time period and beam sequence can be signalled via higher layer signalling)
      a. Lock beam #1 for a period of t1 seconds
      b. Release beam #1 after t1 seconds
      c. Lock beam #2 for a period of t2 seconds
      d. Release beam #2 after t2 seconds
      e. Repeat for all beams in the specified beam sequence
  Prepare to lock a specific null or a specific combination of nulls, e.g., null 1, null 2 or nulls 1 to N
    Definition of "null sequence lock with specified time period" command (time period and null sequence can be signalled via higher layer signalling)
      a. Lock null #1 for a period of t1 seconds
      b. Release null #1 after t1 seconds
      c. Lock null #2 for a period of t2 seconds
      d. Release null #2 after t2 seconds
      e. Repeat for all null in the specified null sequence
  Swap beam pairs, Swap multiple beams
  Swap null pairs, Swap multiple nulls
  Prepare to track beam(s)/null(s)
  Track/measure beam(s)/null(s)

Preparation to lock one or more beams or parts thereof may be understood as establishing a condition for the apparatus/DUT so as to operate in a mode to be measured which is locked during the measurement. It is noted that also a combination of beams/lobes and nullS may be locked and/or prepared to be locked.

Alternatively or in addition, measurement of receiver interference suppression capabilities (free running null(s) while keeping main beam direction(s) fixed) may be performed as described in connection with FIG. 3c.

This may include to create an intra-/intercell interference scenario and sending "beam lock" command, i.e., the locking signal indicating the respective beam(s) or parts thereof, to the DUT so as to keep beam direction fixed. Then the following steps may be performed alone or in combination.
  Performing receiver interference suppression measurements (such as receiver sensitivity by changing power levels of interfering signals)
  Performing receiver interferer-tracking performance measurements (such as time-to-track interferers, or absolute null-depth(s) by changing directions of interfering signals, or generation of new interfering signals).

Alternatively or in addition and with reference to FIG. 3c, this may include a measurement of receiver interference suppression capabilities (fixed null directions and change of main beam direction). Then the following steps may be performed alone or in combination.
  Creating intra-/intercell interference scenario and send "null lock" command, i.e., the locking signal indicating the respective null or nulls to the DUT so as to keep null direction(s) fixed
  Performing receiver interference suppression measurements (such as receiver sensitivity by changing power level, or modulation, etc. of Tx signal)
  Performing receiver beam-tracking performance measurements (such as time-to-track beam by changing direction of Tx signal, or DUT orientation).
  Preparing to sweep beam(s)/null(s)
  Sweeping beam(s)/null(s) in given step sizes/for given duration(s)

With reference to FIG. 5a, FIG. 5b and FIG. 5c, the measurement system may be configured for iteratively in at least a first and a second iteration locking the beam and at least one communication parameter of the apparatus. The measurement system may further be configured for determining a characteristic of the apparatus after having locked the beam and the at least one communication parameter, the characteristic being dependent on the at least one communication parameter, and for unlocking the beam and the at least one communication parameter.

The measurement system may comprise a test fixture 35 configured for holding the apparatus 10 and a measurement unit 26 configured for determining the characteristic of the apparatus. The measurement system may be configured for moving the apparatus relative to the measurement unit 26 between the determination of the characteristic in the first iteration and in the second iteration.

Figure 6A:
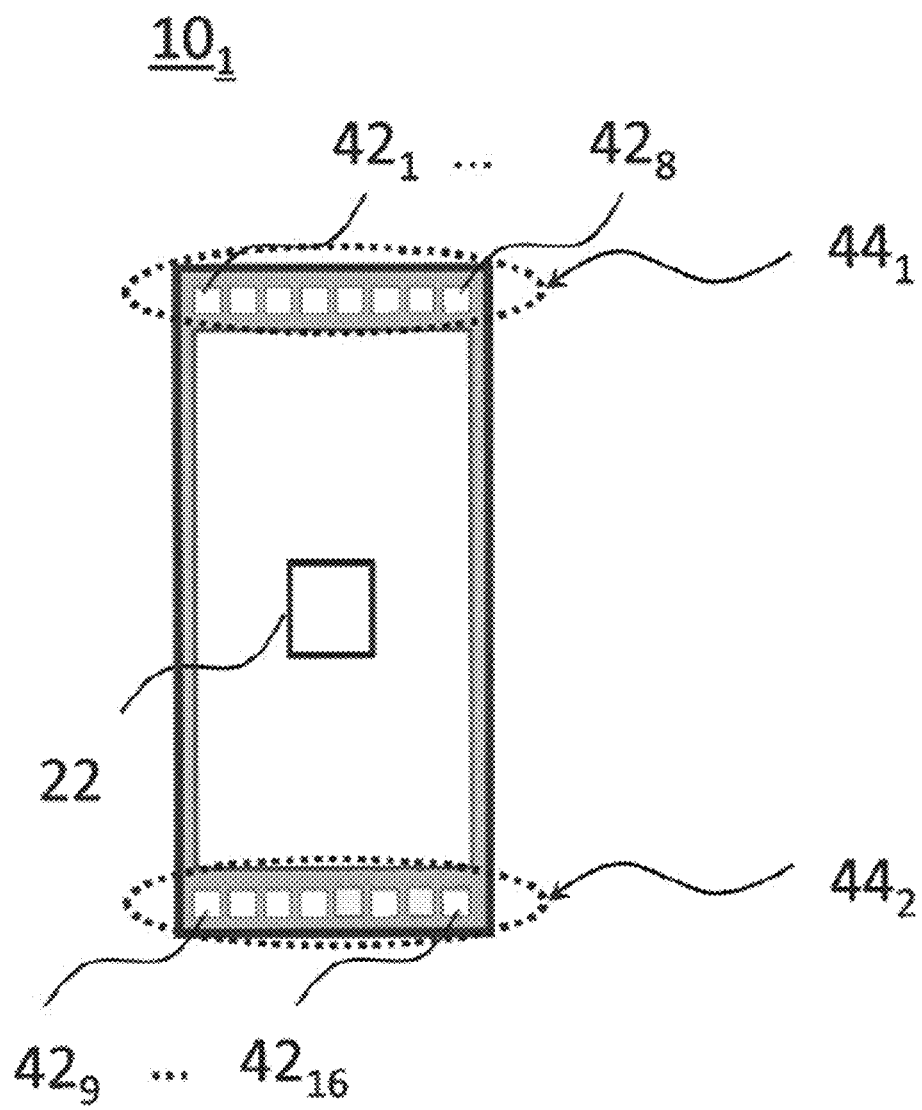
FIG. 6a shows a schematic block diagram of an apparatus according to an embodiment having two antenna arrays.

FIG. 6a shows a schematic block diagram of an apparatus $10_1$ according to an embodiment. The apparatus comprises a plurality of antenna elements 42 being combined so as to form antenna arrays $44_1$ and $44_2$, wherein by non-limiting example only, each antenna array $44_1$ and $44_2$ comprises a number of 8 antenna elements 42. Although being described as having a number of two antenna arrays, the apparatus $10_1$ may comprise a different number of antenna arrays, e.g., 1, 3, 4, 5 or even more. Although being described as having a same number of antenna elements 42, the antenna arrays 44 may comprise a numbers thereof differing from each other. Although being described as having a number of 8 antenna elements 42, the antenna array $44_1$ and/or $44_2$ may comprise a different number, e.g., at least 1, at least 2, at least 4, at least 9 or even more. Each of the antenna arrays $44_1$ and $44_2$ may be configured for forming its own beam(s), wherein the beams may overlap, e.g., in the far field, and may form a common beam or beam pattern. Responsive to the locking signal, the apparatus $10_1$ may be configured for lock beam(s) or parts thereof formed by only some of a total number of antenna arrays.

In other words, FIG. 6a shows an example of a user equipment device comprised of two uniform linear antenna arrays, each containing 8 antenna elements (not to scale).

Figure 6B:
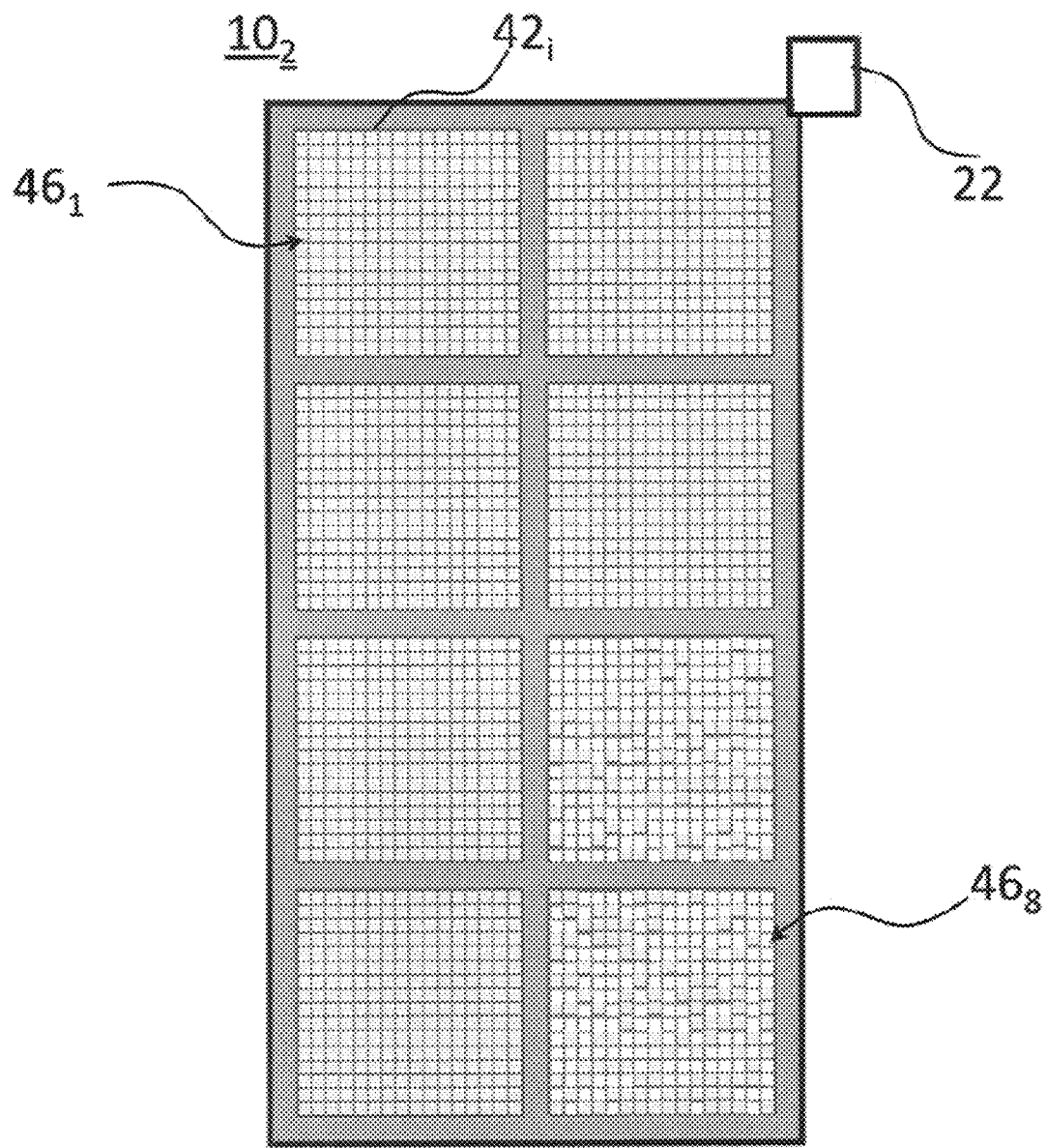
FIG. 6b shows a schematic block diagram of an apparatus according to an embodiments having a plurality of antenna subarrays.

FIG. 6b shows a schematic block diagram of an apparatus $10_2$ having a number of eight subarrays $46_1$ to $46_8$ of antenna elements 42, each antenna subarray 46 comprising, for example, 256 antenna elements 42 arranged in a 16×16 matrix. A number of subarrays, a number of antenna elements therein and/or a number of antenna elements between different subarrays 46 may be different from the configuration shown. A number of subarrays may be, for example, at least 1, at least 3, at least 4, at least 5, at least 10 or even more. A number of antenna elements therein may be, for example, at least 1, at least 5, at least 10, at least 100 or even at least 500 or more. The antenna elements may be arranged in any suitable order, e.g., according to a square, a line, a rectangle or any other order. The subarrays may be formed equal with respect to each other or different. As described for the antenna arrays, each subarray may form at least a part of a beam. Therefore, the locking signal may indicate to lock the parts of the overall beam pattern generated by specific subarrays or by all subarrays.

For example, a DUT may comprise one or more antenna arrays, wherein at least one of the antenna arrays comprises itself a number of subarrays, the number being any number greater than one. For example, the antenna arrays or subarrays may be arranged in a tiled structure. Such a structure may be referred to as an arrangement of antenna panels, wherein each antenna panel may be a functional unit of an antenna array or subarray. Each of these panels may be designed so as to form one or more beams for transmission and/or reception purposes. The locking signal may indicate to lock the one or more beams created by that panel, i.e., all beams or only a subset thereof. This may be used for various purposes, including but not limited to a test and measurement of the pattern created by the antennas comprised in the panel. Alternatively or in addition, the locking signal may indicate to lock the one or more beams associated with each panel. This may allow for controlling configurations in which the complete antenna or antenna array comprises one or more panels. The DUT may be configured to operate accordingly i.e., the locking signal may cause the DUT to lock one or more specific beams of a panel or subarray independently from other beams of the same panel and/or different panels.

These embodiments may apply to arbitrary arrangements of panels and sub-panels, examples of which could include both regular and irregular tiling schemes. In view of the apparatus such as apparatus 10, the wireless interface of the apparatus may comprise a plurality of antenna subarrays, each subarray configured for forming at least a portion of the part of the beam pattern In other words, FIG. 6b shows an example of a base station antenna array comprised of eight sub-panels (sub-arrays). Each sub-panel is comprised of a 16×16 uniform rectangular array containing 256 antenna elements (not to scale).

Figure 7:
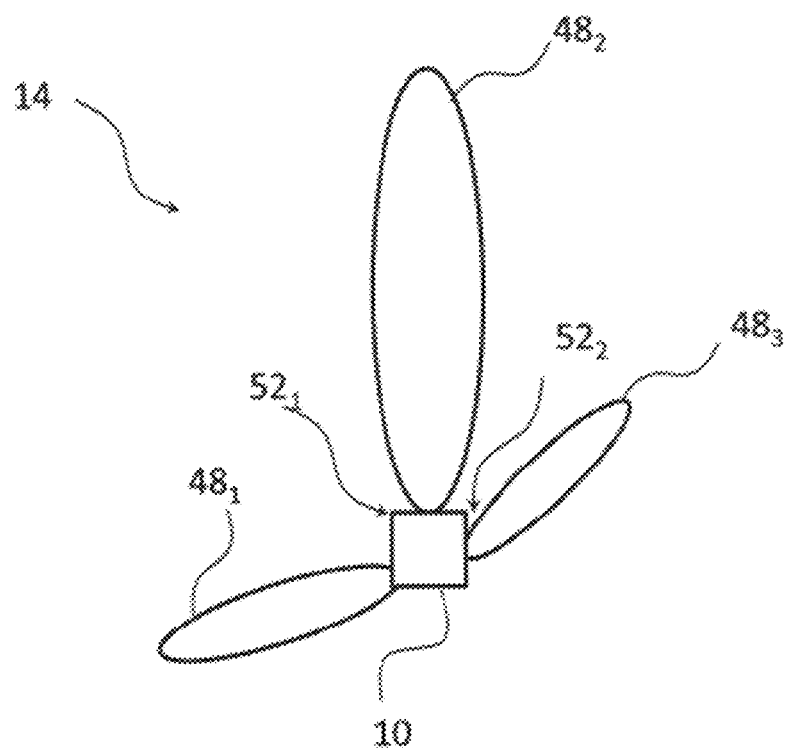
FIG. 7 shows a schematic block diagram of an apparatus being configured for forming a beam so as to comprise lobes and nulls.

FIG. 7 shows a schematic block diagram of the apparatus 10 being configured, by way of example, to transmit the beam pattern 14 so as to comprise three lobes, wherein the lobe $48_2$ may form a main lobe/beam and lobes $48_1$ and $48_3$ may form side lobes. Between two beams $48_1$ and $48_2$, $48_2$ and $48_3$ respectively a null $52_1$, $52_2$ respectively is arranged. It is noted that nulls 52 may be arranged independently from beams or lobes. The apparatus may be configured for forming any other beam and or combination of beams, i.e., an extended beam pattern. Further, a beam may be formed by more than one lobe. For example, the apparatus 10 may form a first beam pattern being quasi omni-directional so as to receive or send control information and may use a different beam pattern having lobes and/or nulls for transmitting/sending or receiving user data. Alternatively or in addition, the apparatus may be configured for forming a beam pattern so as to comprise at least one transmission beam and at least one receiving beam.

The embodiments described herein may relate to a test setup comprising a test system and one or more DUT such as at least one base station and/or at least one UE. During a test to be performed for testing one or more properties and/or behaviours of the at least one DUT, the measurement system and the one or more DUT may communicate with each other, for example, using the locking signal 24 and/or the status signal 33.

Some embodiments described herein relate to Over-the-Air (OTA) measurements, i.e., the measurements performed may be executed at least partially but advantageously completely over the air, i.e., wireless. This does not exclude additional communication between the DUT and the measurement system over additional channels, also referred to as side channels, e.g., for instructing the DUT so as to act in a dedicated way. Such side channels may be implemented wired and/or wireless as described in connection with the apparatus 10 transmitting the signal 33 to the measurement setup 20.

The apparatus may transmit the respective signal 33 for different purposes such as facilitating the measurements. Some embodiments are described in the following. The signal 33 may be referred to as a status signal indicating a status of the apparatus or a reply to a query received. The status signal 33 may be transmitted by the apparatus automatically, i.e., when an event occurs that triggers such a transmission and/or responsive to a received request signal, for example, from the measurement system 30. A triggering event may be, for example, a change in the operation of the apparatus, e.g., a change in the operation mode, a change in the control of the beamforming, a deviation from a requested operation such as a failure to lock the part of the beam and/or the communication parameter, and/or a time interval. The request signal may be contained or included in the locking signal 24 and/or may be transmitted as a separate signal using an interface such as the transmission interface 32, the measurement interface 26 or a different interface. I.e., communication relating to a status of the apparatus, the test and/or further purposes may be established between the apparatus 10 and the measurement system 30. Such communication may allow for facilitating the tests performed by the measurement system. In particular, such communication may allow for keeping the status of the other partner within the measurement setup transparent, in particular the status of the apparatus 10 for the measurement system 30.

According to an embodiment, by transmitting the status signal 33, the apparatus 10 may indicate which operation mode is implemented or active. This may allow the measurement system 30 to adapt the test condition according to the indicated operation mode. For example, before a start of the measurement, the apparatus 10 may be instructed, e.g., by the measurement system 30, so as to sequentially operate in a plurality of operating modes, wherein the operating modes may differ from each other with respect to the beam pattern, e.g., a number of beams and/or a subset of the set of possible beams formed, the communication parameter, e.g., a direction of the beams, a power of the beams a modulation coding scheme of the beams or the like. This may allow the measurement system 30 so as to test the apparatus in a plurality of operating modes without instructing the apparatus 10 to each single operating mode between the tests. Further, this may allow to obtain a time synchronisation between the apparatus 10 and the measurement system 30.

Alternatively or in addition, this may allow for a common time base between the apparatus and the measurement system, e.g., for using guard intervals between measurements for changing configuration, calibration or the like.

When performing a multi-step measurement containing multiple steps differing from each other, e.g., with respect to an orientation of the apparatus 10, an operation mode of the apparatus 10, a number of DUT active in the measurement setup or the like, the status signal 33 may further be used for an acknowledge indicating that the apparatus 10 is ready for the next step.

A step in single-step measurements and/or multi-step measurements may be instructed as described above. Alternatively or in addition other parts or properties of the beam pattern may be instructed to be locked. Such a lock may comprise a provocation and/or instruction to set a respective property or communication parameter to a desired value. For example, a Power Spectral Density (PSD) may be instructed to be adjusted at least on a dedicated frequency band according to a predefined pattern, i.e., along one or more steps the PSD has to be kept constant or has to be varied along different steps of the measurements.

An acknowledge or response or confirmation signal may be transmitted between some or even all steps of the measurement. Such a signal may also be transmitted once or in a higher number in single-step measurements. Examples for such an acknowledge may be:
- "lock of analogue stage (e.g., whilst remaining the digital stage) of Rx beam #m complete"
- "lock of digital stage of Rx beam #m complete"
- "lock of analogue and digital stage of Rx beam #m complete"
- "lock of analogue stage of Rx beam #m failed"
- "lock of analogue stage of Tx beam #m complete"
- "lock of Tx null #n complete"
- "lock of analogue stage of Rx beam {#a, #b, #m} ∈ M complete", wherein M is the set of all possible Rx beams
- "unlock of digital stage of Rx beam #m complete"
- "Activation/deactivation of beam #m complete"
- Response on query reporting the requested information For identification and naming one or more beams and/or nulls, the respective signal may contain an identifier identifying at least one beam/null. The identifier may be a number or any other suitable identifier. For example, beams may be discriminated or distinguished from each other by the use of predefined and known symbols such as symbols of a Sounding Reference Signal (SRS) transmitted within the beams. The predefined symbols may vary from beam to beam such that by determining the symbols it may be determined which beam(s) is/are formed. Thus, the locking signal may comprise one or a plurality of parameters, e.g., one or more of:
- a time which includes a deactivation time (for example, a value between a minimum value and a maximum value may indicate to lock for that specific time indicated wherein the minimum value such as zero may indicate to unlock and the maximum value may indicate to permanently lock)
- a beam number/identifier, e.g. two beams on same panel or two beams from different panels or different beams for SRS and data
- a part of the beam pattern such as a null, side lobe, . . .
- an allocated band It is noted that this list is incomplete and shall only illustrate possible components of the status signal 33 which may contain amongst other things:
- Action to be done (e.g., lock/unlock/wait/prepare)
- Part of beam pattern control network (analogue stage, digital stage,
- Communication direction (Rx and/or Tx)
- Indicator of one or more beams to be applied
- Status of the action (e.g., completed, failed, in queue, coming next, amount thereof finished or the like)

In connection with the status "fail" of the action, e.g., for "link failed" or "lock failed", the apparatus may, for example, send a report on a reason, why it failed or terminated a specific lock command. Even if a link between the SS (measurement system) and the UE (apparatus) is lost or misunderstood, the apparatus (UE) may transmit a message or may save the status, e.g., in a log file. Alternatively or in addition, the SS may send a beam lock status request such that the DUT is requested to send information (the request may be an additional command requesting to verify that beam was locked all the time). Responsive hereto, the apparatus may report its status to the measurement system. Responsive hereto, the measurement system may send the unlocking signal to the apparatus so as to deactivate the beam lock.

According to an embodiment, the apparatus 10 may transmit the status signal 33 for indicating further operation modes, e.g., such that are not to be tested. For example, the apparatus 10 may indicate that it recalibrates or ends a current operation mode and may thereby indicate that the current or following time interval may be excluded from tests.

According to an embodiment, unlocked beams may be deactivated or remained unlocked and active. This allows for scenarios in which locking of Rx-beams and Tx-beams is independent such that, for example, an Rx-beam may remain in track mode and a Tx-beam may be locked. For example, a main beam may be fixed/locked while keeping null tracked to a certain direction.

According to an embodiment, the locking signal indicates a specific time to elapse before an event, e.g., commands like "Freeze null/beam n for time x" or "do until"/"do after". Using the status signal 33, the apparatus 10 may indicate that the indicated time or waiting condition as elapsed.

According to an embodiment, the apparatus 10 is configured for receiving the control signal 24 and may transmit the status signal 33 as a completion signal indicating that the requested locking is completed, done, finished or executed. In other words, the apparatus may acknowledge the requested operation. This allows the measurement system performing the tests based on knowledge that the apparatus has switched to the requested operation and may therefore allow for avoiding unnecessary waiting time until the apparatus is expected to complete the operation. Same applies to the unlocking signal. The apparatus may send the signal 33 as a completion signal so as to indicate that the beam pattern or the requested part thereof is unlocked.

According to an embodiment, the apparatus may send the status signal 33 so as to contain information indicating a status of the apparatus. An example for such status information is information indicating the one or more beams formed with the apparatus, e.g., a number thereof. For example, an apparatus configured for forming N transmission beams and/or M reception beams may indicate which of the N and M beams is currently formed and/or which are not formed. This may allow the measurement system to determine or check the operation of the apparatus as it knows what the apparatus is doing.

According to an embodiment, the measurement system may be configured for requesting such status information from the apparatus, e.g., by including such a request into the locking signal and/or by sending a suitable request signal using an interface such as the measurement interface 26 or a different interface. Alternatively, the apparatus may transmit the status signal 33 automatically.

Alternatively or in addition the measurement system may request status information from the apparatus. For example, using the status signal, the measurement system may request information about the current and/or scheduled and/or past operation, e.g., which beam(s) is/are currently active or to be activated at next. Alternatively or in addition, the request or query may contain information so as to indicate a request to transmit information indicating an MCS state of the apparatus 10, a power level, a Rx gain, information referring to the power control, an automatic gain control (AGC), EQ (Equalizer) active/inactive, EQ tracking, a status of the beam locking such as active/inactive/identifier of locked beam or the like. Alternatively or in addition, the requested information may refer to a power level being set by the apparatus 10 and/or a confirmation of an instructed power level. Each parameter describing the beam pattern properties 14 at least partially and/or each communication parameter may be set or instructed by the measurement system, e.g., using the locking signal or a different signal. Alternatively or in addition, each parameter describing the beam pattern 14 at least partially and/or each communication parameter may be set or instructed by the measurement system may be confirmed or reported by the apparatus 10, the DUT respectively. The confirmation may be implemented similar to an acknowledge/completion command but may be transmitted on a request/query.

According to embodiments, the measurement system 30 may be configured for measuring power and phase of beams formed by the apparatus. According to other embodiments a measurement system may be configured for measuring e.g. the beam pattern purely based on the received power, e.g., using power meters. Such "power only" detectors may, in contrast to sensors able to measure the amplitude and phase of the received electromagnetic wave, be configured for measuring the power level in absence of phase information. If power only detectors are used then capability of using performing tests in which one beam/null is formed only and having every element is weighted with the same antenna weights although the measured test signal may comprise a constant power over time. A suitable test sequence may use continuous wave (CW) transmission and/or a use of suitable SRS.

According to an embodiment which uses the beam identifiers and which is described in detail in connection FIG. 8*a*, FIG. 8*b* and FIG. 8*c*, measurement procedures may be implemented by the measurement setup 20.

Figure 8A:
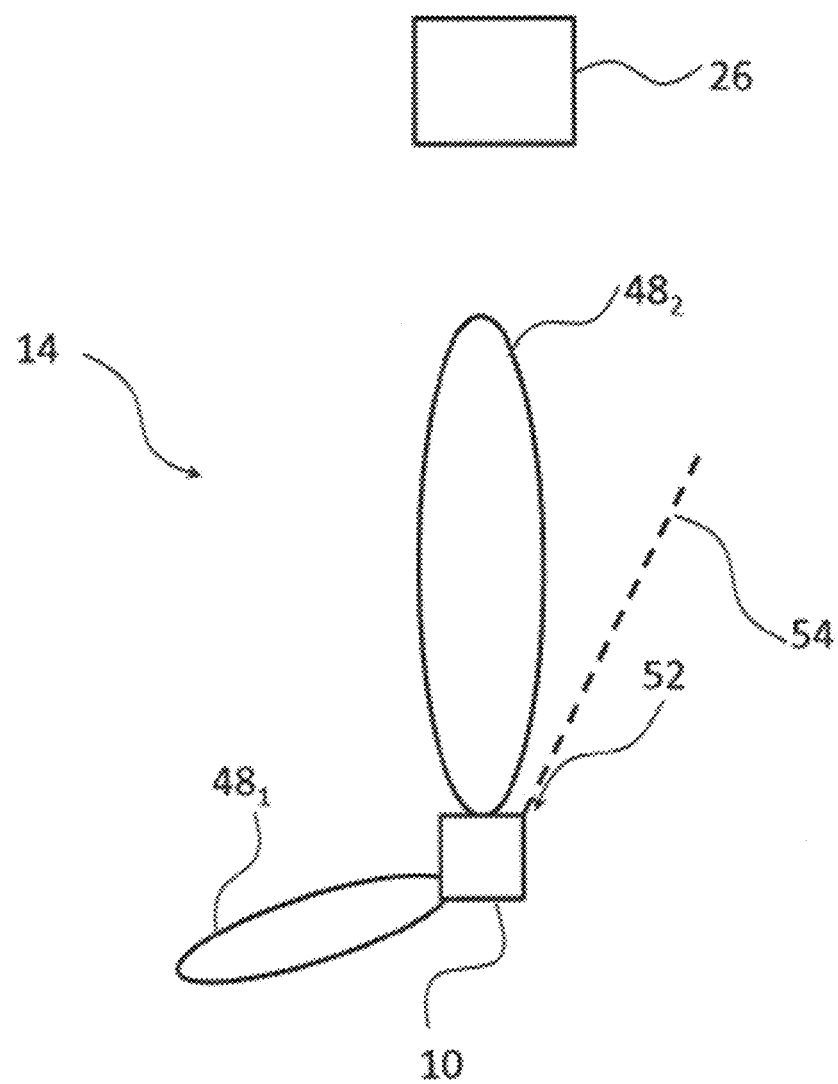
FIGS. 8a-c show schematic diagrams of a measurement procedure which may be performed by a measurement setup, according to an embodiment.

For example, first and as illustrated in FIG. 8*a*, a first beam/null or subset of beams/nulls of the possible beams/nulls to be formed by the apparatus may be formed. The beam pattern may comprise at least the main lobe/beam $48_2$ and the null 52, the null 52 pointing towards a direction 54 relative to the apparatus 10. The lobe $48_2$ may be directed towards the measurement interface 26 which may perform measurements. As a second step, the beam pattern 14 may be locked. I.e., a method for testing an apparatus may comprise operating the apparatus 10 so as to obtain the beam pattern 14 generated by the apparatus 10. This may be similar as described in connection with steps 102 and/or 302. The apparatus 10 may be instructed so as to lock at least a part of the beam pattern 14 and the communication parameter as described in connection with steps 306 and 308.

Figure 8B:
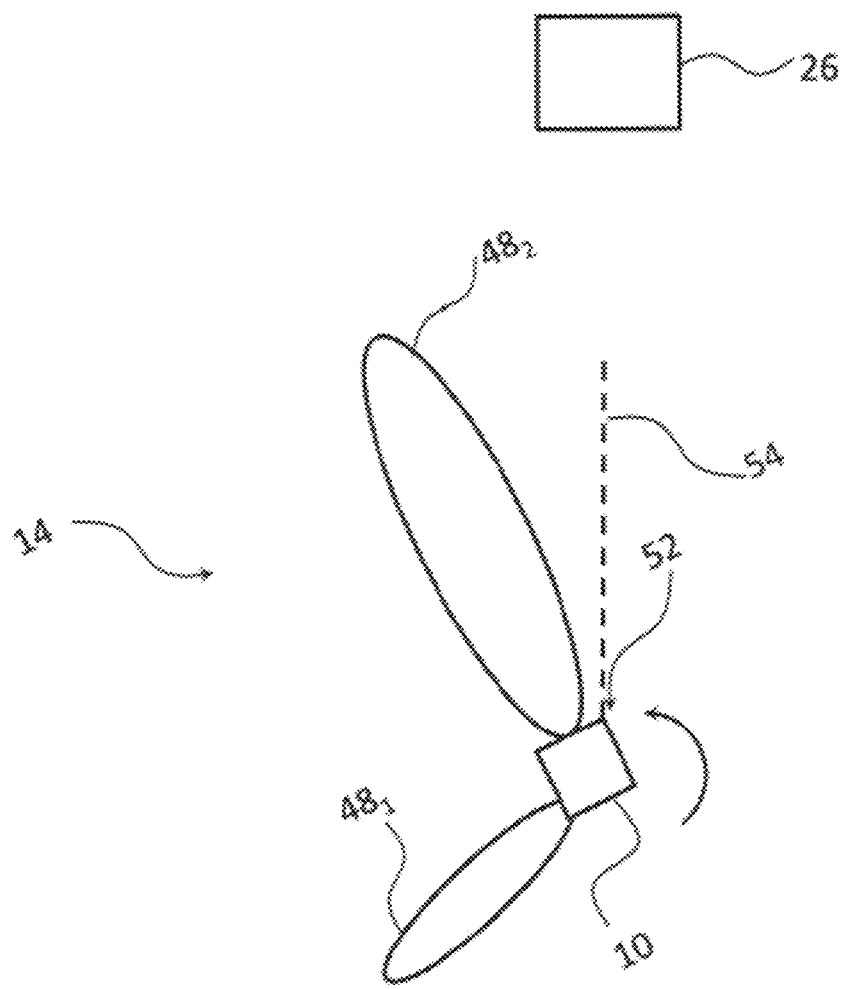

As illustrated in FIG. 8*b*, third, the apparatus 10 may be moved/turned/rotated/positioned, e.g., until the null 52 is directed to the link antenna or measurement interface 24, i.e., the direction 54 may essentially point towards the measurement interface 26. The measurement interface 26 may perform measurements on the null 52. I.e., the apparatus may be moved such that the null 52 of the beam pattern 14 is directed towards the measurement interface 24 being configured for measuring the beam pattern 14.

Figure 8C:
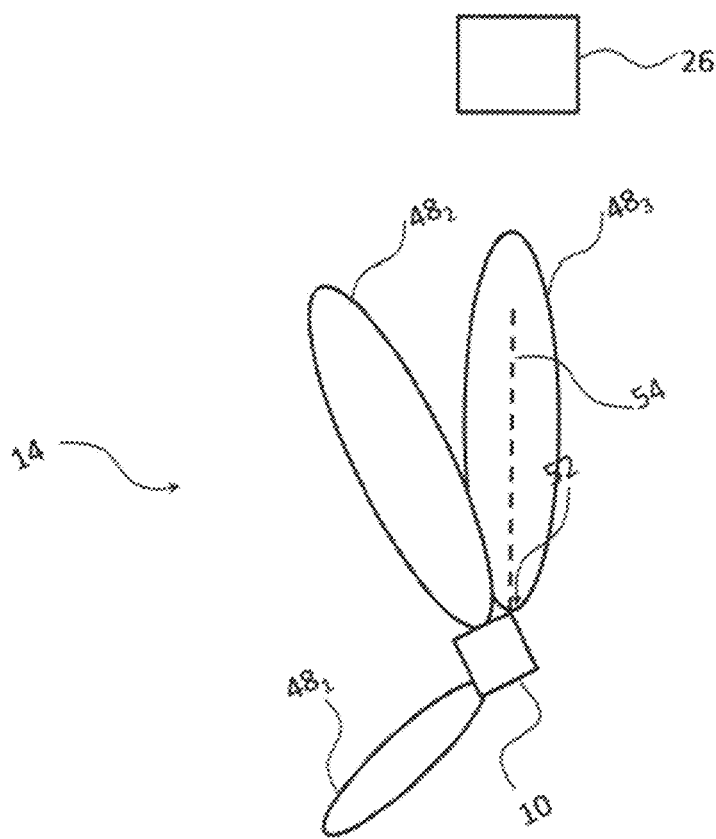

As illustrated in FIG. 8*c*, fourth, the apparatus 10 may be requested to form an additional beam/lobe $48_3$ which is possibly directed towards the measurement interface 26 and may thus overlap with the null 52. Fifth, measurements such as a crossbeam interference measurement may be performed with the measurement interface 26, i.e., the influence of the additional beam $48_3$ on the null 52 may be measured. For indicating which beam has to be activated, identifiers of the beam may be used. I.e., the apparatus may be instructed so as to form at least the lobe $48_3$ of the beam pattern 14 so as to superimpose the null 52. The metrics of the apparatus 10 may be determined as described, for example, in connection with steps 106 and/or 312, i.e., measuring of the beam pattern 14 may be performed with the measurement interface.

The measurement system 30 may indicate that it requests the apparatus 10 to transmit the status signal 33. The measurement system 30 may set a respective flag in the locking signal or a different message and/or may transmit a respective signal to the apparatus 10. I.e., the measurement system 30 may use a flag indicating a request to react on a set of commands or at least the locking signal 24 and/or the unlocking signal. Alternatively or in addition, a flag may be used to deactivate responding to another set of conditions.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can partially be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] ISO/IEC standard 7498-1:1994
[2] 3GPP TR 38.803, "Study on new radio access technology: Radio Frequency (RF) and co-existence aspects (Release 14)", V14.2.0, 2017-09-28: URL
[3] 3GPP TS 25.141, "Base Station (BS) conformance testing (FDD) (Release 15)", V15.0.0 (2017-09)
[4] 3GPP TS 34.114, "User Equipment (UE)/Mobile Station (MS) Over The Air (OTA) antenna performance; Conformance testing (Release 12)", V12.2.0 (2016-09)

The invention claimed is:

1. An apparatus configured for wirelessly communicating in a wireless communications network, the apparatus comprising:
   a wireless interface configured for wireless communication; and
   a controller configured for controlling a beam pattern of the wireless interface and at least one communication parameter of the beam pattern;
   wherein the apparatus is configured for receiving a locking signal indicating a request for locking the at least one communication parameter; and
   wherein the controller is configured for locking the at least one communication parameter responsive to the locking signal.

2. The apparatus of claim 1, wherein the beam pattern is a sequence of individual and distinguishable beam patterns wherein for locking the at least one communication parameter the controller is configured for controlling at least one of:
   an order of the individual and distinguishable beam patterns within the sequence,
   a duration of a static or dynamic activation,
   a transition from an individual and distinguishable beam pattern into a consecutive individual and distinguishable beam pattern, and
   a repetition cycles and/or durations;
   as a specific beam pattern sequence to be repeated until an unlock signal is received and processed.

3. The apparatus of claim 1, wherein the at least one communication parameter comprises one of a transmission power used for the beam pattern, a test or reference signal selection, a resource mapping used for transmission or reception with a part of the beam pattern, a polarization used for transmission or reception with the part of the beam pattern, a time resource, a frequency resource, a spatial resource, a code resource and a modulation coding scheme used for the wireless communication.

4. The apparatus of claim 1, wherein the apparatus is configured for transmitting a response signal to respond to the locking signal or to respond to a status request.

5. The apparatus of claim 4, wherein the apparatus is configured for generating the response signal to indicate an activation or deactivation of the locking the at least one communication parameter.

6. The apparatus of claim 4, wherein the apparatus is configured for generating the response signal to indicate at least one of:
   a lock of an analogue stage of a specific Rx beam complete"
   lock of digital stage of a specific Rx beam complete
   lock of analogue and digital stage of a specific Rx beam complete
   lock of analogue stage of a specific Rx beam failed
   lock of analogue stage of a specific Tx beam complete
   lock of a specific Tx null complete"
   lock of an analogue stage of a subset of a set of possible Rx beams complete
   unlock of digital stage of a specific Rx beam complete
   Activation/deactivation of a specific beam complete
   Activation/deactivation of a repeated sequence of specific beam patterns to be repeated in a specified order, duration and/or transition phase/period.

7. The apparatus of claim 4, wherein the apparatus is configured for generating the response signal to comprise a response on a query contained in the locking signal reporting the requested information.

8. The apparatus of claim 4, wherein the apparatus is configured for reporting a success and/or a fail of the locking the at least one communication parameter with the response signal.

9. The apparatus of claim 8, wherein the apparatus is configured for reporting a reason, why the apparatus failed or terminated the locking.

10. The apparatus of claim 1, wherein the apparatus is configured for transmitting a response signal to respond to a status request to report about the beam pattern and/or the communication parameter.

11. The apparatus of claim 1, wherein the locking signal comprises information indicating an instruction to set the communication parameter to a value; wherein the apparatus is configured for adjusting the communication parameter to the indicated value and to lock the communication parameter at the indicated value.

12. The apparatus of claim 1, wherein the apparatus is configured for forming the beam pattern for receiving a wireless reception signal and/or for transmitting a wireless transmission signal.

13. The apparatus of claim 1, wherein the apparatus is configured for forming the beam pattern with the wireless interface, the beam pattern comprising at least a first lobe, a second lobe and a null;
   wherein the controller is configured for locking at least one of the first lobe, the second lobe and the null whilst remaining at least one of the first lobe, the second lobe and the null unlocked.

14. The apparatus of claim 1, wherein the apparatus is configured for receiving an unlocking signal indicating a request for unlocking the at least one communication parameter;
   wherein the controller is configured for unlocking the at least one communication parameter responsive to the unlocking signal.

15. The apparatus of claim 14, wherein the controller is configured for unlocking the beam pattern responsive to the unlocking signal.

16. The apparatus of claim 1, wherein the beam pattern comprises a plurality of lobes and/or a plurality of nulls between the lobes, wherein the apparatus is configured to time variably deactivate at least a first lobe or null during a first time interval and for deactivating at least a second lobe or null during a second time interval responsive to the locking signal.

17. The apparatus of claim 1, wherein the locking signal comprises information indicating at least one of a plurality of lobes or one of a plurality of nulls of the beam pattern, wherein the apparatus is configured for locking the lobe or null indicated and for disabling at least one lobe or at least one null different from the indicated lobe or null responsive to the locking signal.

18. The apparatus of claim 1, wherein the controller is configured for unlocking the at least one communication parameter after a time duration indicated by a duration information comprised by the locking signal.

19. The apparatus of claim 1, wherein the apparatus is a User Equipment or a base station.

20. A method for testing an apparatus, the method comprising:
   receiving, with the apparatus, a locking signal indicating a request for locking at least one communication parameter at least a part of a beam pattern formed by the apparatus; and
   locking the at least one communication parameter responsive to the locking signal.

* * * * *